(12) United States Patent
Liu et al.

(10) Patent No.: US 7,277,574 B2
(45) Date of Patent: Oct. 2, 2007

(54) METHODS AND SYSTEMS FOR FEATURE SELECTION

(75) Inventors: Yan Liu, New York, NY (US); John Kender, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/169,107

(22) Filed: Jun. 27, 2005

(65) Prior Publication Data

US 2006/0133666 A1  Jun. 22, 2006

Related U.S. Application Data

(60) Provisional application No. 60/582,853, filed on Jun. 25, 2004.

(51) Int. Cl.
*G06K 9/62* (2006.01)
(52) U.S. Cl. .................. 382/159; 707/7; 712/300
(58) Field of Classification Search .............. 707/7; 712/300; 382/159
See application file for complete search history.

(56) References Cited

OTHER PUBLICATIONS

Liu et al., "Video frame categorization using sort-merge feature selection", Motion and Video Computing, 2002. Proceedings. Dec. 5-6, 2002, pp. 72-77.*

Liu et al. "Sort-Merge Feature Selection for Video Data", Proceedings of the Third SIAM International Conference on Data Mining, San Francisco, CA, USA, May 1-3, 2003.*

Singh and Provan, "A Comparison of Induction Algorithms for Selective and Non-Selective Bayesian Classifiers" Machine Learning: Proceedings of the 12th International Conference, Morgan Kaufman, 1995, pp. 497-505.

L.S. Oliveira et al., "Feature Subset Selection Using Genetic Algorithms for Handwritten Digit Recognition" 14th Brazilian Symposium on Computer Graphics and Image Processing, 2001, pp. 362-369.

N. Abe et al., "Classifier-Independent Feature Selection Based on Non-parametric Discriminant Analysis", In Proceeding of Join IAPR International Workshops, 2002, pp. 470-479.

J. Bi, et al., "Dimensionality Reduction via Sparse Support Vector Machines", Journal of Machine Learning Research 3, Mar. 2003, pp. 1229-1243.

S. Das, "Filters, Wrappers and a Boosting-Based Hybrid for Feature Selection", In Proceedings of the Eighteenth International Conference on Machine Learning, 2001, pp. 74-81.

(Continued)

*Primary Examiner*—Brian P. Werner
*Assistant Examiner*—Christopher Lavin
(74) *Attorney, Agent, or Firm*—Wilmer Cutler Pickering Hale & Dorr LLP

(57) ABSTRACT

Methods and systems for feature selection are described. In particular, methods and systems for feature selection for data classification, retrieval, and segmentation are described. Certain embodiments of the invention are directed to methods and systems for complement sort-merge tree (CSMT), fast-converging sort-merge tree (FSMT), and multi-level (ML) feature selection. Accurate and fast results may be obtained by the feature selection methods and systems described herein.

47 Claims, 21 Drawing Sheets

OTHER PUBLICATIONS

Faloutsos and Lin, "FastMap: A Fast Algorithm for Indexing, Data-Mining and Visualization of Traditional and Multimedia Datasets", Proceedings of ACM SIGMOD, 1995, pp. 163-174.

R.O. Duda, et al., "Pattern Classification", Wiley, New York, 2000.

E.P. Xing, et al., "Feature Selction for High-Dimensional Genomic Microarray Data", Proceedings of the Eighteenth International Conference on Machine Learning, 2001, pp. 601-608.

International Search Report and Written Opinion of the International Search Authority dated Nov. 29, 2006.

* cited by examiner

Sub-tree #1

Sub-tree #2

Sub-tree #3

Handwriting

Announcement

Demo

Discussion

Clean training data

Noisy training data r=4
c=2 r = 8
c = 1~10

$r = 2 \sim 16$
$c = 4$ r=16
c=1~10

Pitching frame

Competing image types frame 240 frame 251 frame 1410

METHODS AND SYSTEMS FOR FEATURE SELECTION

CROSS-REFERENCE TO RELATED APPLICATION

The present application claims the benefit of Provisional Application No. 60/582,853, filed Jun. 25, 2004, the content of which is hereby incorporated by reference herein in its entirety.

STATEMENT REGARDING FEDERALLY SPONSORED RESEARCH OR DEVELOPMENT

The present invention was made with United States government support under Grant No. EIA-00-71954 awarded by the National Science Foundation. The United States Government may have certain rights in this invention.

BACKGROUND

The present invention relates to methods and systems for feature selection. More particularly, the present invention relates to methods and systems for feature selection for data classification, segmentation, and retrieval.

With the explosion of data in areas such as machine learning, pattern recognition, statistics, information theory, philosophy of science, combinatorial chemistry, genetics, computer science, multimedia production, the internet, and the like, the need for fast and efficient data management has become a major issue.

One of the fundamental tasks in data management involves classifying the data into a meaningful manner for subsequent retrieval, manipulation, delivery, segmentation, and/or the like.

Human recognition of an object belonging to a certain classification (category) occurs because we learn to associate certain characteristic features of an object with a particular category. Therefore, once the important features are recognized and associated for an object and a category, we routinely classify other objects having these characteristic features as belonging to that particular category.

For example, humans can recognize a difference between a white paper and a document by the presence of certain features, such as texts and images, which may be present on the paper.

In the example above, selecting a small number of distinguishing features is important for accurate and rapid classification. For example, selecting the white areas of a paper to be the sole meaningful feature of a document will likely lead to incorrectly classifying all white papers to be such a document. However, specifying all possible distinguishing characteristics to classify an object as belonging in a particular category may require an inordinate amount of time, because doing so would require comparing each and every proposed feature.

Feature selection has, thus, been developed to reduce the number of features under consideration to a manageable level in a wide range of applications, such as text categorization, gene microarray analysis, web mining, handwriting recognition, and the like.

However, to date, feature selection in areas having massive data, high dimensionality, and complex hypotheses continues to pose a considerable challenge. In addition, accuracy becomes a critical issue when the training data set is sparse and/or noisy.

As such, methods and systems capable of carrying out feature selection on data containing a large amount of information with high dimensionality are desired. Furthermore, accurate feature selection methods utilizing sparse and/or noisy training data are also desired.

SUMMARY OF THE INVENTION

In accordance with the present invention, systems and methods capable of carrying out feature selection are described. In addition, systems and methods capable of carrying out feature selection for data classification, segmentation, and retrieval are described.

Certain embodiments of the present invention are directed to methods for feature selection, comprising: a) creating a plurality of initial feature subsets from data; b) inducing said initial feature subsets on training data to obtain induced feature subsets; c) sorting said induced feature subsets obtained in step b) in order of performance to obtain sorted feature subsets, wherein induced feature subsets having similar performance are sorted using a heuristic technique; d) merging said sorted feature subsets obtained in step c) or f) to obtain merged feature subsets; e) inducing said merged feature subsets obtained in step d) on training data to obtain induced feature subsets; f) sorting said induced feature subsets obtained in step e) in order of performance, wherein induced feature subsets having similar performance are sorted using a heuristic technique; and g) repeating at least one of steps d), e), and f) until a desired user specified criterion is satisfied.

Other embodiments of the present invention are directed to methods for feature selection, comprising: a) creating a plurality of initial feature subsets from data; b) designing a desired feature subset tree based on one or more user inputs; c) inducing said initial feature subsets on training data to obtain induced feature subsets; d) sorting said induced feature subsets obtained in step c) in order of performance to obtain sorted feature subsets; e) pruning said sorted feature subsets obtained in step d) or h) based on said desired feature subset tree to obtain pruned feature subsets; f) merging said pruned feature subsets obtained in step e) to form merged feature subsets; g) inducing said merged feature subsets obtained in f) on training data to obtain induced feature subsets; h) sorting said induced feature subsets obtained in g) in order of performance to obtain sorted feature subsets; i) repeating at least one of steps e), f), g), and h) until a desired user specified criterion is satisfied.

Other embodiments of the present invention are directed to methods for feature selection, comprising: a) creating a plurality of initial feature subsets from data; b) inducing said initial feature subsets on training data to obtain induced feature subsets; c) sorting said induced feature subsets obtained in step b) in order of performance to obtain sorted feature subsets; d) classifying said data with a feature subset having the highest performance; e) measuring a confidence level of correct classification for said data; f) comparing said confidence value with a threshold value; g) if said confidence value is below said threshold value: g1) merging said sorted feature subsets obtained in step c) or g3) to obtain merged feature subsets; g2) inducing said merged feature subsets obtained in step g1) on training data to obtain induced feature subsets; g3) sorting said induced feature subsets obtained in step g2) in order of performance to obtain sorted feature subsets; g4) classifying said data with a feature subset having the highest performance; and h) repeating at least one of steps e), f), and g), until a desired user specified criterion is satisfied or until said confidence value is above said threshold value in step f).

Other embodiments of the present invention are directed to methods for segmenting a dataset comprising a plurality of data, comprising: a) creating a plurality of initial feature subsets from each of said plurality of data; b) inducing said initial feature subsets on training data to obtain induced feature subsets; c) sorting said induced feature subsets obtained in step b) in the order of performance to obtain sorted feature subsets; d) classifying said plurality of data with a feature subset having the highest performance associated with each data; e) measuring a confidence level of correct classification for each data; f) comparing said confidence level for each data with a threshold value; g) selecting one or more data from said plurality of data having said confidence value below said threshold value; h) merging said sorted feature subsets obtained in step c) or j) of said one or more data having a confidence value below said threshold value to obtain merged feature subsets; i) inducing said merged feature subsets obtained in step h) on training data to obtain induced feature subsets; j) sorting said induced feature subsets obtained in step i) in order of performance to obtain sorted feature subsets; k) classifying said one or more data with a feature subset having the highest performance; and l) repeating at least one of steps e), f), g), h), i), j), and k) until a desired user specified criterion is satisfied or until all of said plurality of data have confidence values above said threshold value in step e).

Other embodiments of the invention are further directed to systems capable of performing the methods described herein.

Other embodiments of the present invention are further directed to computer readable mediums comprising instruction being executed by a computer, wherein the instructions include a software application for feature selection or dataset segmentation, and the instructions implement the steps of the methods described herein.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

The present invention will now be described more fully hereinafter, in which different embodiments of the present invention are shown. The invention may, however, be embodied in many different forms and should not be construed as being limited to the embodiments explicitly set forth herein; rather, these embodiments are provided so that this disclosure will be thorough and complete, and will fully convey the scope of the invention to those of ordinary skill in the art.

Figure 1:
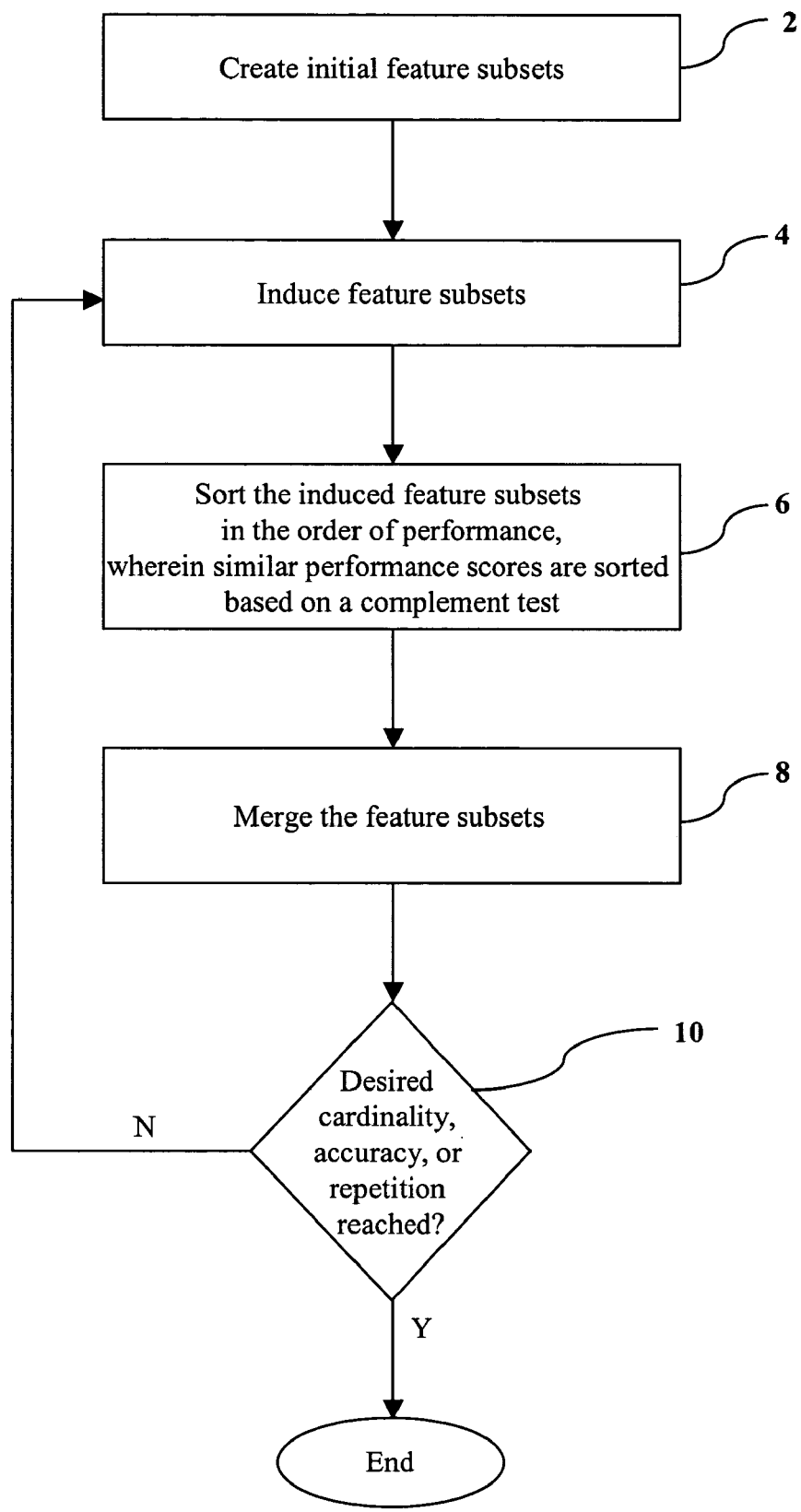
FIG. 1 is a flow chart showing steps carried out in feature selection methods utilizing a complement sort-merge tree technique in accordance with certain embodiments of the present invention.

Certain embodiments of the present invention are directed to feature selection methods utilizing a complement sort-merge tree (CSMT) technique. Methods utilizing a CSMT technique may be particularly beneficial when using a sparse and/or noisy training data set. As shown in FIG. 1, certain methods in accordance with the present invention comprise:

1) creating an N number of singleton feature subsets (denoted as step 2);

2) inducing the feature subsets, which includes evaluating the performance of the feature subsets on an m number of training data, (denoted as step 4);

3) sorting the induced feature subsets in the order of performance and according to a complement test (denoted as step 6);

4) merging the feature subsets to obtain a reduced number of feature subsets when compared to the preceding group of feature subsets, wherein the cardinality in the merged feature subset is larger than the cardinality in the preceding feature subset (denoted as step 8); and 5) repeating steps 4, 6, and 8 until a desired cardinality, accuracy, or repetition has been reached in step 6 (denoted as step 10).

Figure 2A:
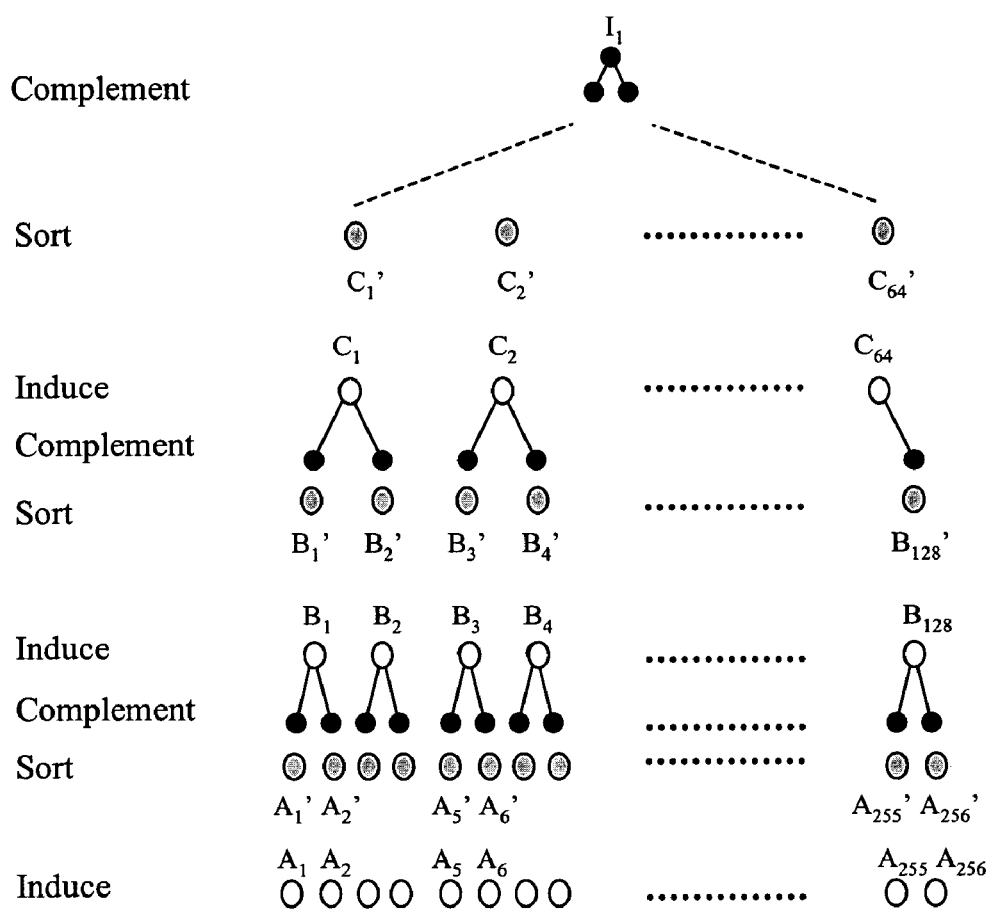
FIG. 2A is a diagram showing how to set up a sort-merge tree using the complement merge-sort tree technique in accordance with certain embodiments of the present invention.

Methods in accordance with certain embodiments of the present invention are illustrated in greater detail by way of an example. Initially at step 2, a singleton feature subset having N=256 features may be created, as indicated by $A_1$-$A_{256}$ at the bottom of FIG. 2A.

The selection of proper feature subsets for a particular application of interest will be readily apparent to one of ordinary skill in the art. For example, feature subsets in an image or video data may be various pixel elements contained in the image or video data. Feature subsets in a handwriting recognition application may also utilize pixel elements. Alternatively, genes may be selected as the feature subsets in a gene microarray application.

Next, in step 4 of FIG. 1, each of the 256 feature subsets may be induced against training data, using a suitable induction method. Examples of such induction methods include Bayesian network, neural network, k-nearest neighbor, SVM, and boosting algorithm.

Appropriate induction methods will be readily apparent to one of ordinary skill in the art. For example, Bayesian network is described in M. Sing, and G. M. Provan, "A comparison of induction algorithms for selective and non-selective Bayesian classifiers," Machine Learning: Proceedings of the 12th International Conference, Morgan Kaufmann, 1995, which is hereby incorporated by reference in its entirety. Genetic and neural network algorithms are described in L. E. S. de Oliveira, N. Benahmed, R. Sabouin, F. Bortolozzi, and C. Y. Suen, "Feature subset selection using genetic algorithms for handwritten digit recognition," 14th Brazilian Symposium on Computer Graphics and Image Processing, (2001), which is hereby incorporated by reference in its entirety. K-nearest neighbor is described in N. Abe, M. Kudo, and M. Shimbo, "Classifier-independent feature selection based on non-parametric discriminant Analysis," In Proceeding of Join IAPR International Workshops (2002), pp. 470-479, which is hereby incorporated by reference in its entirety. SVM is described in J. Bi, K. Bennett, M. Embrechts, C. Breneman, and M. Song, "Dimensionality reduction via sparse support machine," Journal of Machine Learning Research 3 (March) (2003), pp. 1229-1243, which is hereby incorporated by reference in its entirety, and boosting algorithm is described in S. Das, "Filters, wrappers, and a boosting based hybrid for feature selection," In Proceedings of the Eighteenth International Conference on Machine Learning, (2001), pp. 74-81, which is hereby incorporated by reference in its entirety.

In certain embodiments of the invention, a combination of FastMap, for dimensionality reduction, and Mahalanobis maximum likelihood, for classification, can be utilized for induction in step 4 of FIG. 1. Additional details of FastMap and Mahalanobis methods may be found by referring to C. Faloutsos and K.-I. Lin, "FastMap: a fast algorithm for indexing, data-mining and visualization of traditional and multimedia datasets." Proceedings of ACM SIGMOD (1995) 163-174 and R. O. Duda, P. E. Hart, and D. G. Stork, "Pattern classification," Wiley, New York (2000), both of which are hereby incorporated by reference herein. In addition, although the FastMap and Mahalanobis methods would be readily apparent to one of ordinary skill in the art, their significance is summarized herein.

The FastMap method approximates the Principal Component Analysis (PCA), with only linear cost in the number of reduced dimensions sought, c, in the number of features, N, and in the number of training data, m. The method heuristically replaces the computation of the PCA eigenvector of greatest eigenvalue, which represents the direction in the full feature space that has maximum variation, with a (linear) search for the two data elements that are maximally separated in space. The vector between these two elements is taken as a substitute for the eigenvector of greatest eigenvalue, and the full space is then projected onto the subspace orthogonal to this substitute vector for the first eigen dimension. The process then repeats a desired number of times. By using clever book keeping techniques, the performance of the method may be configured to take an amount of time approximately linearly proportional to the number of features.

The Mahalanobis distance computes the likelihood that a point belongs to a distribution that is modeled as a multi-dimensional Gaussian with arbitrary covariance. During training, each image frame in a training set for a desired category is first mapped to a point in the space of reduced dimension, c. Then, the distribution of these mapped points is approximated by a c-dimensional Gaussian with a non-diagonal covariance matrix. Multiple categories and training data are represented, each with their own Gaussian distribution. The classification of test data is obtained by also mapping it into a reduced c-dimensional space. Then, the most likely distribution to which it belongs is calculated. The Mahalanobis maximum likelihood technique also takes an amount of time to perform that is linearly proportional to the number of features.

To further illustrate the combination of FastMap and Mahalanobis maximum likelihood techniques for induction, the following example is provided. First, if the number of training data, m, is 80, then, for each feature, FastMap reduces the dimensionality of the training data from 80 to a desired dimensionality c (c<m). Then, in the reduced dimensionality, the training data is plotted and fitted as a Gaussian distribution. The corresponding feature in the test data is then plotted in the reduced dimensionality space, and it is determined whether the feature in the test data can be classified to be similar to those features in the training data set by measuring the Mahalanobis distance. A score is then calculated based on the performance evaluated by the Mahalanobis criterion.

It should be noted that many of the induction methods described above may, in addition to the performance score, also output a confidence level, which may measure how confident a correct classification has been assigned to the data.

Figure 2B:
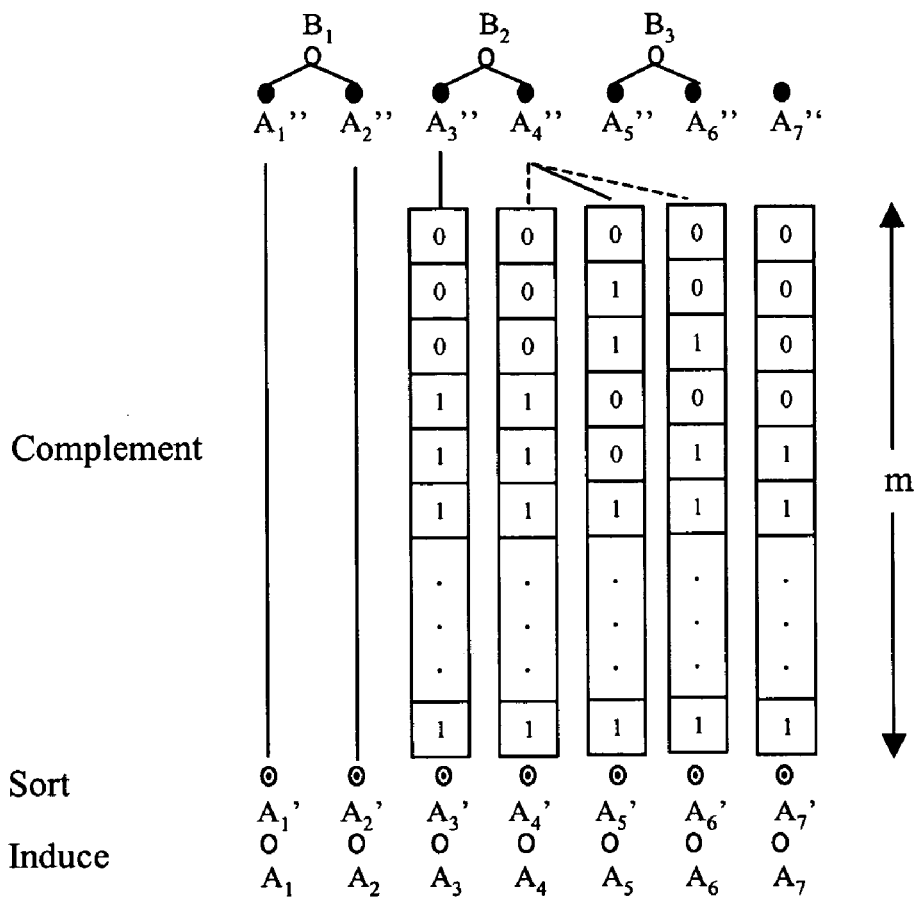
FIG. 2B is a diagram showing how to perform a complement test to sort feature subsets having similar performance scores in accordance with certain embodiments of the present invention.

In step 6 of FIG. 1, the induced features are sorted in order of performance. For example, if feature $A_{100}$ obtained the highest performance score, the feature is relabeled as $A_1'$ and sorted as the leftmost feature in FIG. 2A. However, due to a sparse and/or noisy training data set (256 features versus 80 training data), many of the features may result in a similar performance score. For example, similar performance scores may be tied scores or substantially equal scores. Generally in the art, one of ordinary skill in the art would readily recognize features having similar performance scores. To sort such similar features, a heuristic technique may be employed. A particularly preferred embodiment of such a heuristic technique may be a complement test, as shown in FIG. 2B.

A complement test attempts to find two features which, when combined, do not utilize redundant information from the training data. This complement test essentially is a more informed sorting of the feature subsets compared to a random selection of similar feature subsets.

For example, feature subsets $A_1'$ and $A_2'$ may have the two highest (but different) scores. Thus, these two features may be simply merged together if a pairwise merging of the feature subsets is desired in step 8. However, feature subsets $A_3'-A_6'$ may have tied scores. In this case, a complement test may be invoked.

For the complement test, an m-length (80 training data in this particular example) performance vector for each feature subset may label a correct classifications with a "1" and a failure with a "0." Feature subset $A_3'$ then searches through features $A_4'-A_6'$ which maximizes the number of 1's in the result of the OR operation applied to their two performance vectors.

In feature subset $A_3'$, the performance vector is 1 . . . 1 1 1 0 0 0. In feature subset $A_4'$, the performance vector is also 1 . . . 1 1 1 0 0 0. Therefore, there are no complementary pairs between feature subsets $A_3'$ and $A_4'$, assuming the portions of the vectors represented by " . . . " are identical.

In feature subset $A_5'$, the performance vector is 1 . . . 1 <u>0 0 1 1</u> 0. Therefore, there are four complementary pairs between feature subsets $A_3'$ and $A_5'$ (see underlined), assuming the portions of the vectors represented by " . . . " are identical.

In feature subset $A_6'$, the performance vector is 1 . . . 1 1 <u>0 1</u> 0 0. Therefore, there are two complementary pairs between feature subsets $A_3'$ and $A_6'$ (see underlined), assuming the portions of the vectors represented by " . . . " are identical.

Therefore, in the particular example, feature subset $A_5'$ maximizes the number of complementary pairs with feature subset $A_3'$, and feature subsets $A_3'$ and $A_5'$ may be merged if a pairwise merging of the feature subsets is desired in step 8. This step of the CSMT method is more informed than randomly merging any of the tied feature subsets.

It should be noted that if the feature subsets do not result in any similar performance scores (possibly due to a sufficient amount of training data relative to the number of initial features), a complement test may not be required. Rather, in this case, a simple merging of the feature subsets may be carried out, and the CSMT technique can simply be viewed as being equivalent to a basic sort-merge tree (BSMT) technique.

In step 8 of FIG. 1, the sorted feature subsets can then be merged to produce smaller-sized feature subsets. Any number of sorted feature subsets may be merged together. For example, two or more sorted feature subsets may be merged together.

In certain embodiments, the feature subsets may be merged pairwise to obtain merged feature subsets having half the size of the previous feature subset (256 to 128 features in the particular example), each feature subset having a cardinality of 2. As such, the initial feature subset has 256 feature subsets, each having one feature (N=256, r=1) and the second level of the tree has 128 feature subsets, each having two features (N=128, r=2). The third level of the tree has 64 feature subsets, each having four features (N=64, r=4), and the fourth level has 32 feature subsets, each having eight features (N=32, r=8). This is shown in Table 1 below.

TABLE 1

| Level in the tree | Size of feature subset (N) | Cardinality (r) (Features in feature subset) |
|---|---|---|
| 1 | 256 | 1 |
| 2 | 128 | 2 |
| 3 | 64 | 4 |
| 4 | 32 | 8 |
| 5 | 16 | 16 |
| 6 | 8 | 32 |
| 7 | 4 | 64 |
| 8 | 2 | 128 |
| 9 | 1 | 256 |

The 128 feature subsets may then be induced, sorted, and merged as described in steps 4, 6, and 8 of FIG. 1 until a desired cardinality or accuracy is found.

Addiction refinements may also be utilized. For instance, dimensionality reduction may be carried out in each of the merged feature subsets, and not just during the induction step. As mentioned above, as successive merges reduce the number of feature subsets, the cardinality in each feature subset increases. Furthermore, each of the merged feature subsets may contain redundant information that necessarily need not be considered exhaustively. As such, dimensionality reduction in each of the merged feature subsets can also be carried out to speed up the feature selection process.

In certain embodiments, dimensionality reduction carried out in each of the merged feature subsets may be carried out using the FastMap technique, but any other suitable methods readily apparent to one of ordinary skill in the art may be utilized.

Additional refinements may be directed to the case wherein a user wishes to select exactly r features from the hierarchy of feature subsets. If r is a power of two, no additional processing may be required. However, if r is not a power of two, additional trimming of the tree may be carried out.

Figure 3:
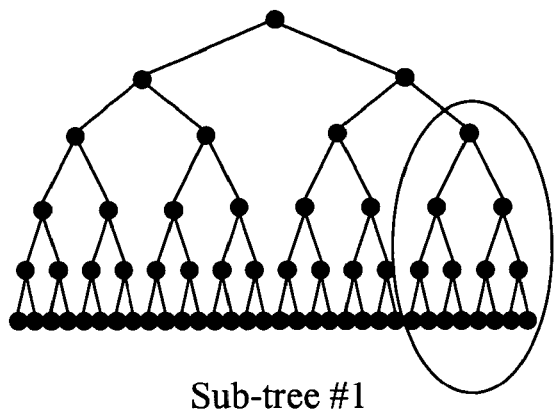
FIG. 3 is a diagram showing how to trim the tree structure based on a user input specifying a feature subset size of 20 in accordance with certain embodiments of the present invention.
Figure 3:
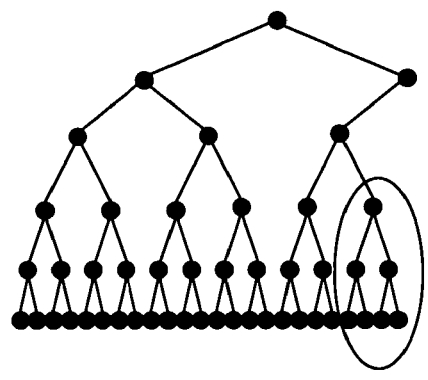
Figure 3:
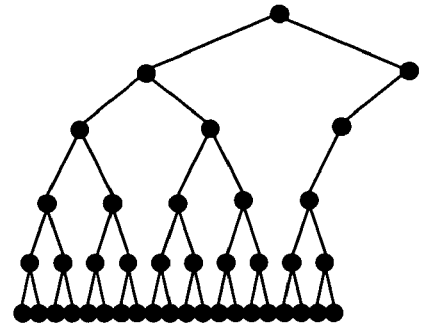

As shown in FIG. 3, the user may specify that the number of features in each feature subset is desired to be 20 (r=20). For the sake of illustration, assume each of the dots corresponds to feature subset and is called a node. Since r is between $2^4$ and $2^5$ (16 and 32), the leftmost (and therefore the most accurate) sub-tree with $2^5$ nodes is extracted from the full tree. This results in a sub-tree #1 with 12 nodes in excess of the desired amount.

At this point, $2^3$ (=8) rightmost (therefore most error prone) nodes are cut from sub-tree #1, leading to a sub-tree #2 having 4 nodes in excess of the desired amount. As such, $2^2$ (=4) rightmost nodes are again cut from this sub-tree #2 to obtain a final sub-tree #3 having exactly r=20 features.

The computation time for feature selection methods utilizing the CSMT technique is linearly proportional to the number of nodes in the sort-merge tree. Since each node contains features which must be induced on, $T \sim O(N \times T_m)$, where $T_m$ is the time it takes for induction using m training data. Therefore, given an equal number of features, reducing the number of nodes may lead to significant savings in computation time.

Various features of the invention can be further appreciated by considering the following examples.

EXAMPLE 1

Figure 4:
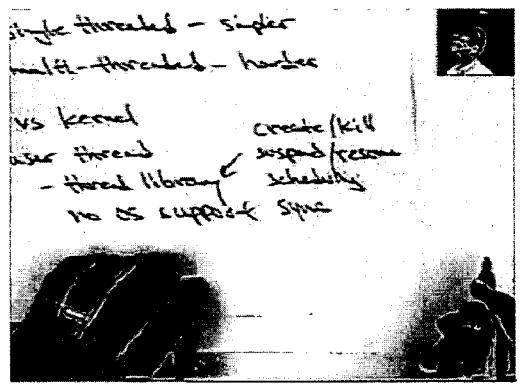
FIG. 4 shows examples of frames classified as handwriting, announcement, demo, or discussion in accordance with certain embodiments of the present invention.
Figure 4:
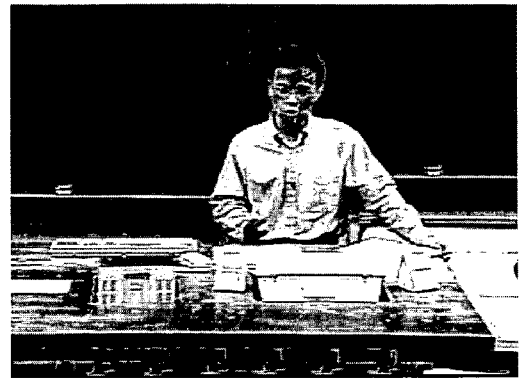
Figure 4:
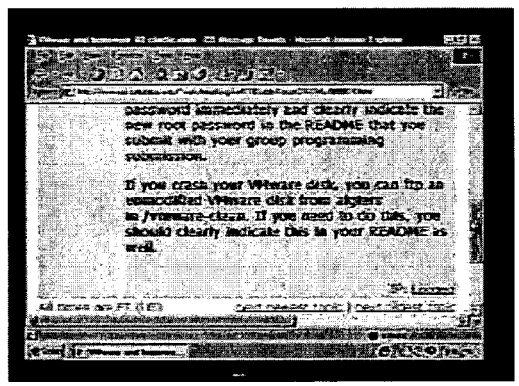
Figure 4:

A video retrieval task from a 75-minute 320×240 pixel MPEG-1 encoded classroom instructional video may be implemented using sparse training data. As part of this process, frames of the video may be classified according to various categories and retrieved. As shown in FIG. 4, the classroom instructional video was classified into four different categories of video data: handwriting, announcement, demo, and discussion. It should be noted that feature selection in video data is considered to be especially difficult due to the large volume of data associated with video information.

For clarity, some standard features of the MPEG format are first described. The Moving Picture Expert Group (MPEG) standard is a widely accepted international standard for digital video compression. An MPEG stream can be considered to be composed of a series of Groups of Pictures (GOPs), usually two GOPs/sec. GOPs consist of three types of picture frames—I-frames, P-frames, and B-frames. In general, each GOP is led by one I-frame, which is coded using information present in the picture itself, and followed by several P-frames and B-frames, coded using the reference I or P-frames. Typically, an I-frame contains a full image, while P and B-frames are utilized for forward predictive and bidirectionally predictive encoding.

Each I-frame picture can be divided into 8×8 blocks of pixels, and each block may have an associated DC term and 63 AC terms resulting from a Discrete Cosine Transform (DCT) performed on those pixels. The DC term is 8 times the average intensity of the respective block. Four neighboring 8×8 blocks form a MacroBlock (MB). The DC terms of each MB are presented by four luminance channels and two chrominance channels. In a common 4:2:0 chrominance format, there are two chrominance block per MB for each of the four luminance blocks, making a total of six blocks per MB.

In general, video data can be down-sampled temporally, spatially, and/or spectrally. The video data in this example may be temporally and spatially down-sampled by using the DC terms of each MB every other I-frame (i.e. 1 frame/second). Therefore, for each second of video, 300 MBs (15×20 MBs) of six bytes (four luminance+two chrominance blocks) of data may be obtained. For convenience, the six DC terms from the same MB may be considered to be an un-decomposable vector, so the initial data may be considered to consist of 300 six-dimensional features per second of video. Therefore, for the 75-minute video above, there may be 4500 frames, each having 300 six-dimensional initial features.

Figure 5:
FIG. 5 shows examples of a clean training data frame and noisy training data frames in accordance with certain embodiments of the present invention.
Figure 5:
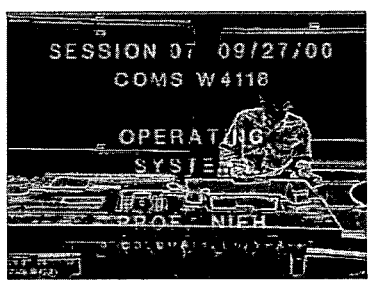
Figure 5:
Figure 5:

In Example 1, retrieving about 200 frames classified as announcement frames from the 4500 frames of video is attempted. No prior temporal segmentation or other pre-processing is carried out. Only 80 training frames are provided (40 announcement frames and 40 others). As shown in FIG. 5, the training frames may include considerable noise. The 4500 frames of video are analyzed using the CSMT feature selection technique with the training data described above. These frames are classified and the error rates for each frame are obtained. Frames classified as announcement frames are retrieved.

For comparison, a method called random feature selection was utilized, as described in E. P. Xing, M. I. Jordan, R. M. Karp, "Feature selection for high-dimensional genomic microarray data," Proceedings of the Eighteenth International Conference on Machine Learning (2001), which is hereby incorporated by reference herein in its entirety. A random feature selection method may be utilized as an acceptable comparison as other existing feature selection methods have been reported to run for several days on feature sets of cardinality at least one order of magnitude smaller than the current dataset.

Figure 6:
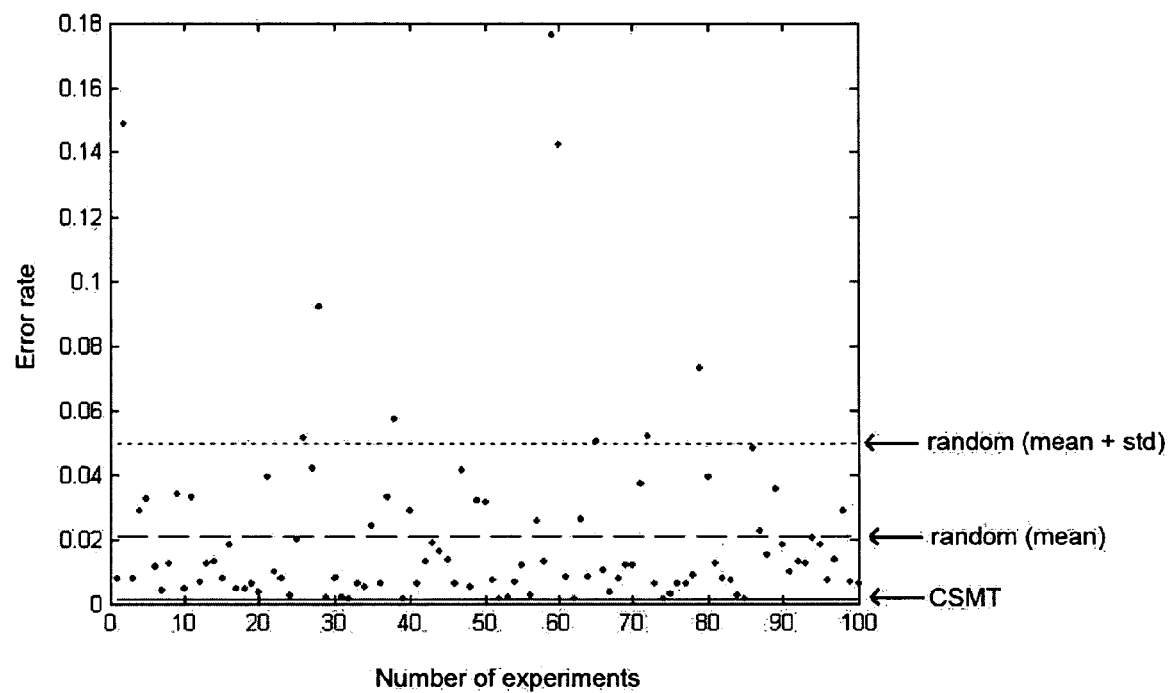
FIG. 6 shows a comparison of the error rates obtained using a complement sort-merge tree feature selection technique versus a random feature selection technique when a FastMap dimension (c) is equal to two and the number of features is equal to four in accordance with certain embodiments of the present invention.

For induction, a combination of FastMap and Mahalanobis techniques may be utilized. FIG. 6 shows the results that may be obtained when comparing the results using only four features (r=4) when the FastMap dimension is equal to two (c=2). Points in FIG. 6 show the error rates that may be obtained by the random feature selection method. As shown, the error rates for the random feature selection method may be highly variable, with the standard deviation being larger than the mean (average). The error rates using features selected by the CSMT feature selection technique, shown as a solid line, however, clearly would have less scatter.

Figure 7:
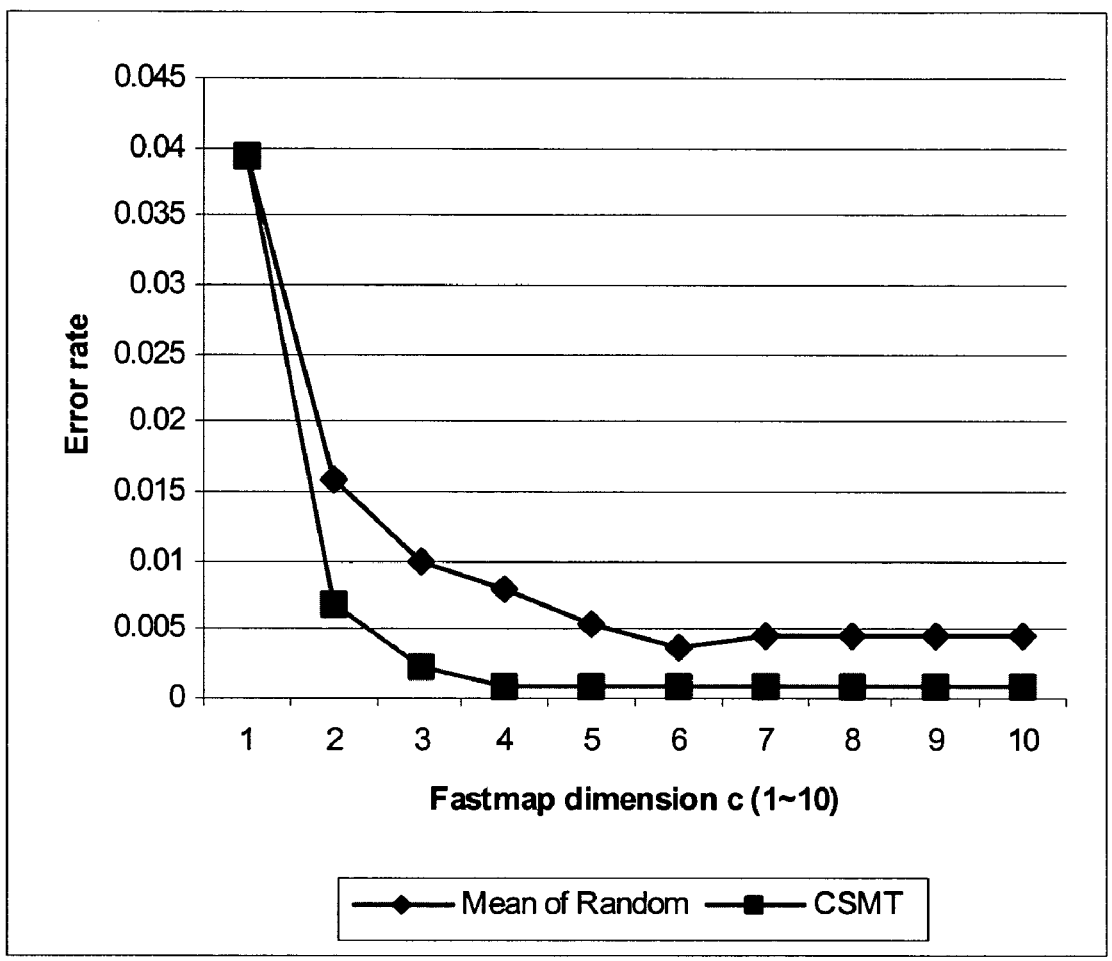
FIG. 7 shows a comparison of error rates obtained as a function of a FastMap dimension (c) using a complement sort-merge tree feature selection technique versus a random feature selection technique for a feature subset size of eight in accordance with certain embodiments of the present invention.

FIG. 7 shows a plot of the mean (average) error rates that may be obtained with the CSMT feature selection technique and with the random feature selection technique for different FastMap dimensions (c ranging from one to ten), keeping the number of features fixed at eight (r=8). The mean (average) error rates that would be obtained with the CSMT feature selection technique appear to be lower as compared to the random feature selection technique.

Figure 8:
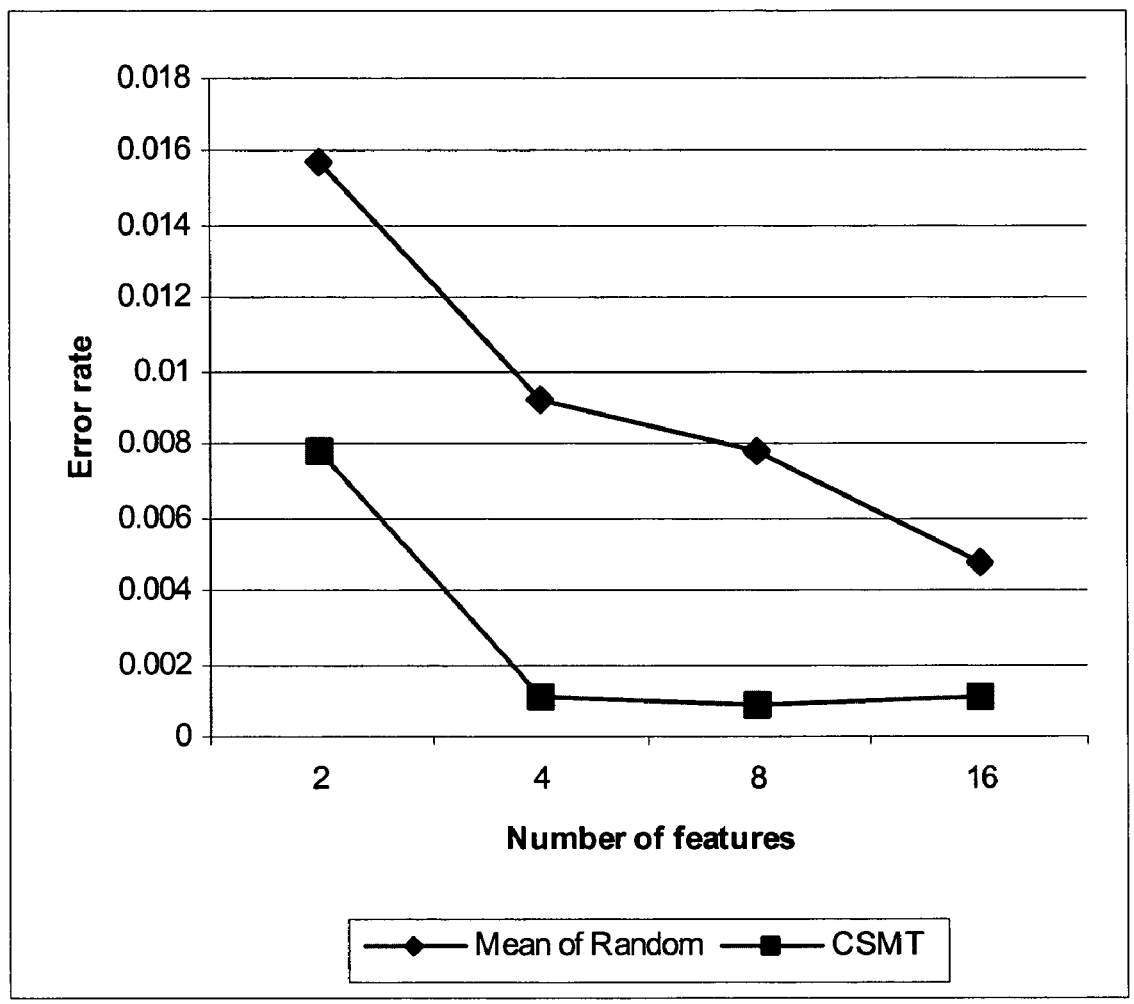
FIG. 8 shows a comparison of error rates obtained as a function of feature subset size using a complement sort-merge tree feature selection technique versus a random feature selection technique for a FastMap dimension (c) of four in accordance with certain embodiments of the present invention.

FIG. 8 shows a plot of the mean (average) error rate that may be obtained for a varying number of features (r=2, 4, 8, or 16) while fixing the FastMap dimension to be four (c=4). Again, the mean (average) error rate would be lower for the CSMT feature selection technique as compared to the random feature selection technique.

EXAMPLE 2

In this example, the data described in E. P. Xing, M. I. Jordan, R. M. Karp, "Feature selection for high-dimensional genomic microarray data," Proceedings of the Eighteenth International Conference on Machine Learning (2001) may be utilized with the CSMT feature selection technique.

Using the identical data, definitions, and evaluation metric of Xing et al., an error rate of 5.9% may be obtained using the CSMT feature selection technique, which is the same error as that obtained by Xing et al., but significantly lower computation time may be required.

These examples clearly show that feature selection methods utilizing a CSMT technique provide a fast and accurate method to classify and retrieve desired data using only a sparse and/or noisy training data set.

Even greater improvements in speed may be obtained. As described above, feature subsets can be sorted after induction based on their performance with respect to the training data. The tree is sorted from left to right based on the highest to lowest performance score. As such, it may be possible to focus only on the more accurate (left) part of the tree early on. The advantage of this technique lies in the fact that the computation time, which as mentioned above is linearly proportional to the number of inductions (nodes in the sort-merge tree) since $T \sim N \times T_m$. Therefore, reducing the number of nodes in the sort-merge tree, by removing unimportant nodes, may lead to significant reduction of computation time.

Figure 9:
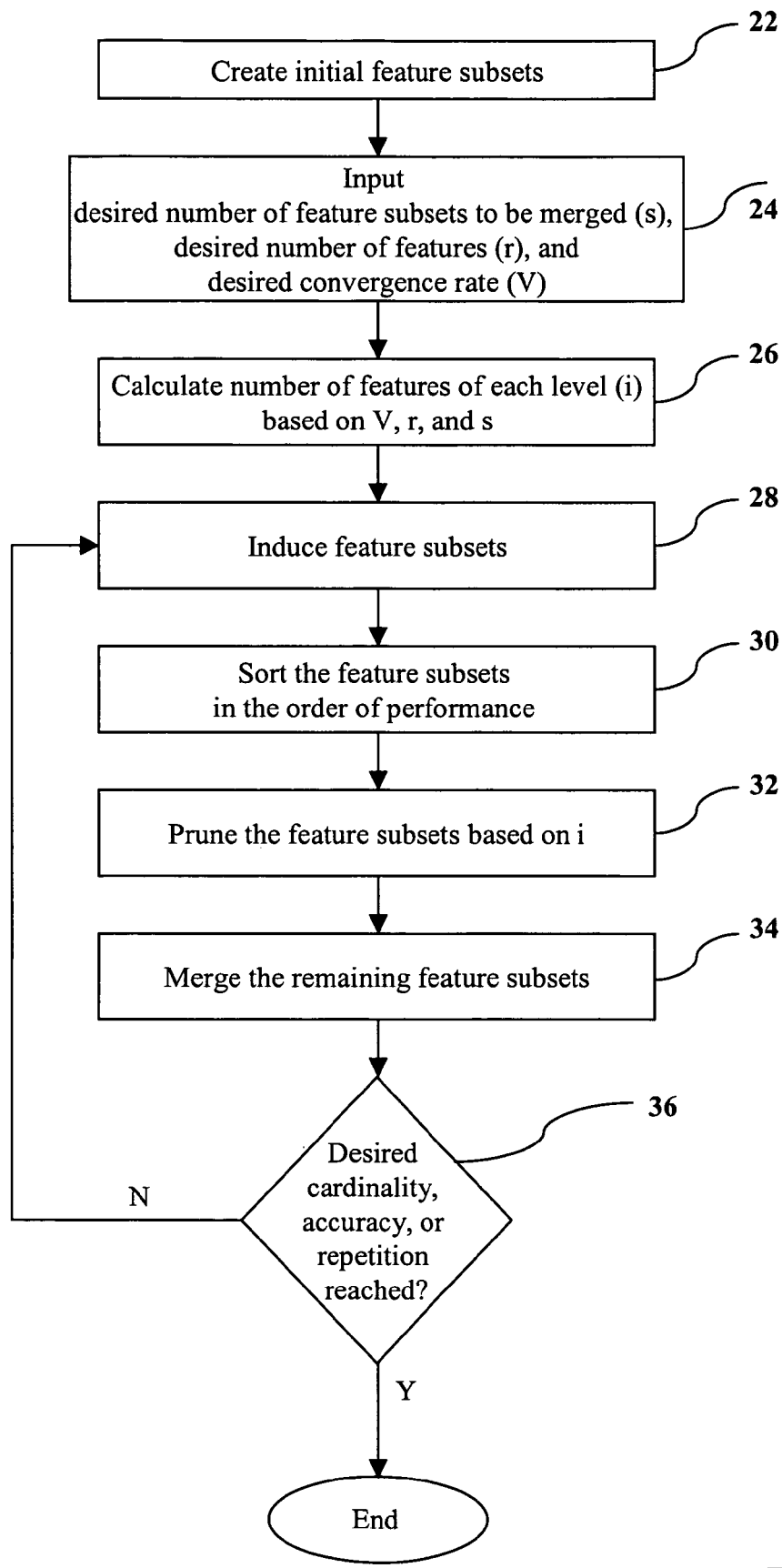
FIG. 9 is a flow chart showing the steps carried out in methods for feature selection utilizing a fast-converging sort-merge tree technique in accordance with certain embodiments of the present invention.

As such, certain embodiments of the present invention are directed to feature selection methods utilizing a fast-converging sort-merge tree (FSMT) technique. As shown in FIG. 9, methods in accordance with the present invention comprise:

1) creating an N number of singleton feature subsets (denoted as step 22);

2) inputting a desired number of features (r) for evaluation, a convergence rate (V) of a feature subset tree, and the number of feature subsets to be merged at each level (s) (denoted as step 24);

3) calculating the number of feature subsets for each level (i) of the tree based on r, s, and V (denoted as step 26);

4) inducing the feature subsets, which includes evaluating the performance of the feature subsets on an m number of training data set (denoted as step 28);

5) sorting the induced feature subsets in the order of performance (denoted as step 30);

6) pruning the current feature subset level based on i (denoted as step 32);

7) merging the remaining feature subsets to obtain merged feature subsets having a smaller number of feature subsets when compared to the preceding group of pruned feature subsets (denoted as step 34); and 8) repeating steps 28, 30, 32, and 34 until a desired cardinality, accuracy, or repetition has been reached in step 30 (denoted as step 36).

Methods in accordance with certain embodiments of the present invention are illustrated in greater detail by way of an example. Initially, at step 22 of FIG. 9, a singleton feature subset having N=1800 features may be created, as indicated by $A_1$-$A_{1800}$ at the bottom of FIGS. 10A, 10B and 10C.

Figure 10A:
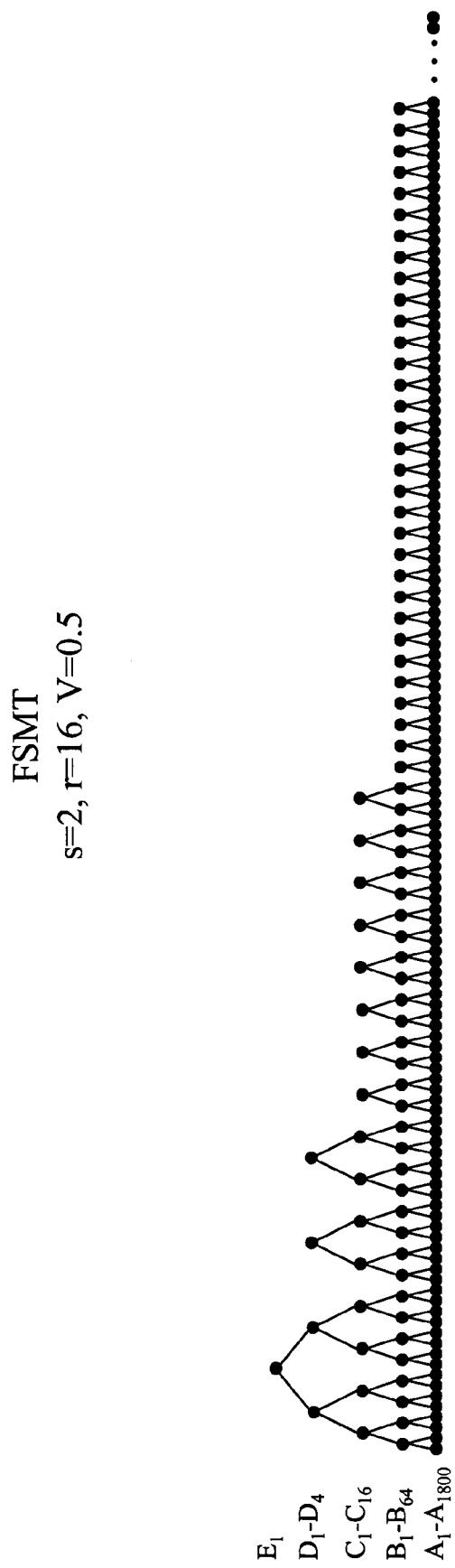
FIG. 10A is a diagram showing a first method of setting up a sort-merge tree using a fast-converging merge-sort tree technique in accordance with certain embodiments of the present invention.
Figure 10B:
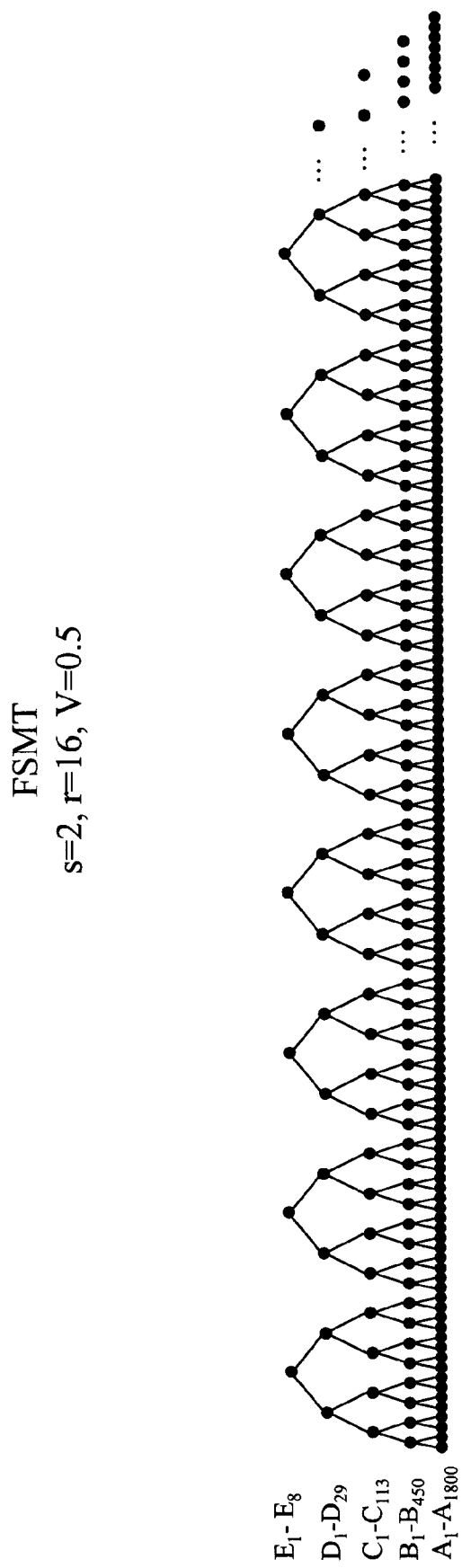
FIG. 10B is a diagram showing a second method of setting up a sort-merge tree using a fast-converging merge-sort tree technique in accordance with certain embodiments of the present invention.
Figure 10C:
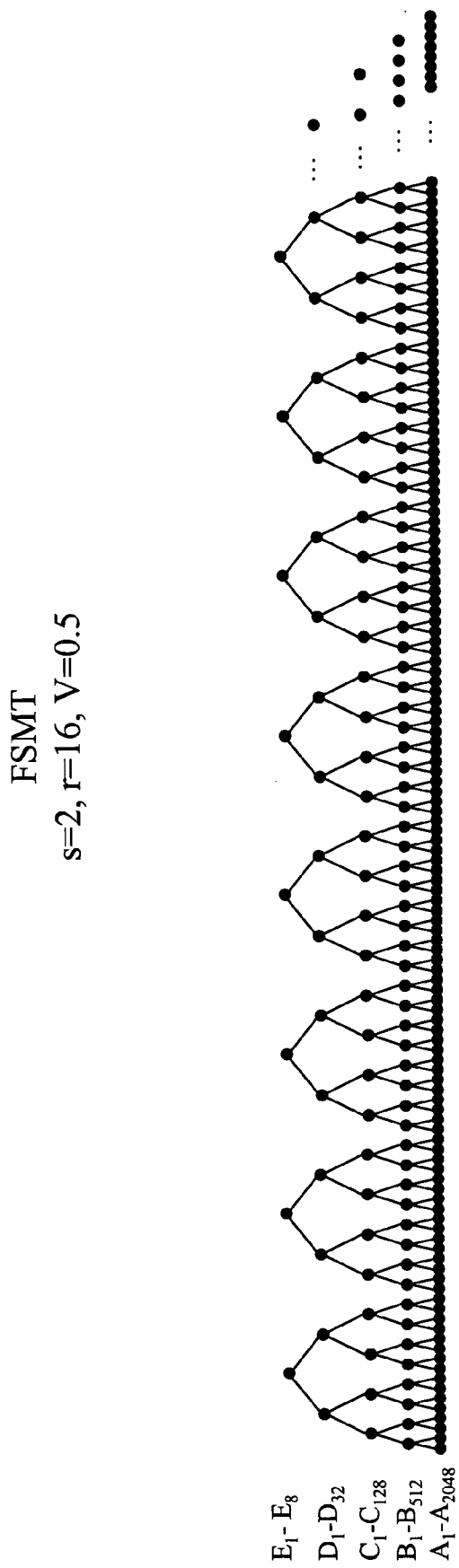
FIG. 10C is a diagram showing a third method of setting up a sort-merge tree using a fast-converging merge-sort tree technique in accordance with certain embodiments of the present invention.

Next, in step 24 of FIG. 9, a user may indicate that a desired number of feature subsets to be merged (s), a desired number of features (r), and a desired convergence rate (V) may be s=2, r=16, and V=0.5, as shown in FIGS. 10A, 10B, and 10C. However, any other desired number of features, convergence rate, and number of feature subsets to be merged at each level of the feature subset tree can be selected. In this particular example, convergence rate was set at 0.5, meaning that one-half of the feature subsets at each level of the tree should be pruned, and the number of feature subsets to be merged at each level was set at two.

Next, in step 26 of FIG. 9, the number of feature subsets in each level of the tree (i) is calculated based on V, r, and s. Any suitable structure of tree can be utilized. Moreover, in certain instances, it may be desirable to try different tree structures to identify the one that works best (e.g. as shown in FIGS. 10A, 10B, and 10C).

FIG. 10A shows a first possible structure for the tree, in which the tree is designed from the top down. In this instance, the user indicated that 16 features are desired with a convergence rate of 0.5 and pairwise merging of the feature subsets. Therefore, the final level of the tree may have a single feature subset node with r=16. Therefore, four additional levels ($2^4$=16=r) of the tree are required. Calling the final node $E_1$, the next lower level of the tree may contain 4 feature subsets ($D_1$-$D_4$), each having r=8 features. As the convergence rate was specified to be 0.5, $D_3$ and $D_4$ would be pruned and discarded after inducing on all $D_1$-$D_4$ feature subsets to sort this level.

Similarly, the next lower level may contain 16 feature subsets ($C_1$-$C_{16}$), each having four (r=4) features. Only feature subsets $C_1$-$C_8$ would be merged to form feature subsets $D_1$-$D_4$, and feature subsets $C_9$-$C_{16}$ would be pruned and discarded.

The next lower level would then contain 64 feature subsets ($B_1$-$B_{64}$), each having two (r=2) features, wherein only feature subsets $B_1$-$B_{32}$ would be merged to form feature subsets $C_1$-$C_{16}$.

The first (initial, lowest) level would contain the 1800 features subsets ($A_1$-$A_{1800}$), each feature subset having one (r=1) feature. In this case, only feature subsets $A_1$-$A_{128}$ would be merged to form feature subsets $B_1$-$B_{64}$, while feature subsets $A_{129}$-$A_{1800}$ would be pruned and discarded, after all of feature subsets $A_1$-$A_{1800}$ are evaluated and sorted.

FIGS. 10B and 10C respectively show second and third possible structure for the tree, in which the tree is designed from the bottom up. As before, four additional levels ($2^4$=16) of the tree are required in the particular example.

In FIG. 10B, each successive level of the tree can first be divided by two to create the new feature subsets, because the convergence rate is 0.5. In addition, neighboring feature subsets may be merged pairwise (i.e. divided by 2). As such, each successive level may contain one quarter of the number of feature subsets as the previous level, and the second level will contain 450 feature subsets each having two (r=2) features.

The third level has a complication in that 450/4 is not an integer number. In such cases, the number of feature subsets can be rounded up or down. As shown in FIG. 10B, the number of feature subsets was rounded up for this particular example. As such, the next level has 113 feature subsets each containing four (r=4) features.

The fourth level has 29 feature subsets each containing eight (r=8) features and the final fifth level has eight feature subsets each containing sixteen (r=16) features. However, as opposed to the example described in FIG. 10A, the final (top) level does not have a singular node, but rather 8 nodes. As such, only the leftmost node will be selected as the feature subset for classification.

FIG. 10C shows a third possible way of forming the tree structure. As noted above with reference to FIG. 10B, dividing the number of feature subsets by 4 in each case may not lead to an integer value. As such, dummy variables can be inserted in the initial feature subset so that all subsequent levels may result in an integer number, as dictated by the convergence rate and the number of feature subsets to be merged. As shown in FIG. 10C, the number of initial (bottom) feature subsets in this example may be expanded to be 2048 (next highest power of 2 from 1800). Preferably, induction is not carried out on the dummy variables so that the induction time is not adversely affected.

In this instance, the second level has 512 feature subsets each containing two (r=2) features. The third level has 128 feature subsets each containing four (r=4) features. The fourth level has 32 feature subsets each containing eight (r=8) features. The fifth and final level has 8 feature subsets each containing sixteen (r=16) features. Again, the leftmost node may be selected as the feature subset for classification.

At this point, the computation time based on the induction times can be analyzed for each of the trees described in FIGS. 10A, 10B, and 10C. In FIG. 10A, a total of 1884 (i.e., 1800+64+16+4) nodes are present. In FIG. 10B, a total of 2400 (i.e., 1800+450+113+29+8) nodes are present. In FIG. 10C, a total of 2480 (i.e., 1800+512+128+32+8) nodes are present. As such, in the particular example, the number of induction steps may range from 1884 to 2480, depending on how the tree is set up.

In contrast, feature selection methods utilizing the CSMT technique utilize a total of 3488 (i.e., 1800+900+450+225+113) nodes. Therefore, computation time would take approximately 1.4-1.85 times more when using the CSMT feature selection technique rather than the FSMT feature selection technique.

In general, the convergence rate, V, may be between 0 to 1. Smaller values of V may prune larger portions of the features subsets at each level of the tree structure and may provide more computational time savings. For example, if V=0.25, three-quarters of the feature subsets may be pruned at each level of the tree structure. If V=0, only one induction step may be carried out and sorted, wherein the left-most feature subset may be utilized as the feature subset for classification. However, if V=1, only a merge of the feature subsets may be performed, without pruning any feature subsets in each level of the tree structure. As such, when V=1, the FSMT feature selection technique can be viewed as being substantially similar to the BSMT or CSMT feature selection technique.

In step 28 of FIG. 9, any suitable induction methods may be utilized. Examples of such induction methods include Bayesian network, neural network, k-nearest neighbor, SVM, and boosting algorithm.

It should be noted that many of the induction methods described above, in addition to the performance score, can also assign a confidence level reporting how confident a correct classification has been assigned to a data.

In certain embodiments of the invention, a combination of FastMap, for dimensionality reduction, and Mahalanobis maximum likelihood, for classification, can be utilized in step 28 of FIG. 9.

In step 30 of FIG. 9, the induced features are sorted in order of performance. As discussed above in connection with the feature selection methods utilizing the CSMT technique, certain feature subsets may have similar performance scores. As described above, similar performance scores may be tied scores or substantially equal scores. Generally in the art, one of ordinary skill in the art would readily recognize features having similar performance scores. To sort such similar feature subsets, a complement test may be utilized as described previously with reference to FIG. 2B. However, any suitable methods that sort feature subsets with similar performance scores can be utilized. For example, similar scores can be sorted simply by taking whichever appears earlier. Alternatively, feature subsets having similar performance scores can be sorted by randomly picking any suitable feature subsets having similar performance scores.

In certain embodiments, the information gain of the feature subsets at each level may be utilized to sort any features subsets having similar performance scores. In this technique, a metric $G(C,F)$, calculates the reduction of entropy in classifying C categories using the feature subset F. This method would be readily apparent to one of ordinary skill in the art.

In step 32 of FIG. 9, the sorted feature subsets may be pruned based on the desired feature subset tree designed in step 26 to obtain pruned feature subsets.

In step 34 of FIG. 9, the pruned feature subsets can then be merged to produce smaller-sized feature subsets. Any number of sorted feature subsets may be merged together. For example, two or more pruned feature subsets may be merged together.

In the example above, the feature subsets can then be merged pairwise to produce the next level of feature subsets having half the number of features subsets when compared to the number of feature subsets in the previous level. Again, each new feature subset has a cardinality that is twice as larger than the cardinality of the feature subsets in the previous level. These new features subsets are then induced, sorted, pruned, and merged, as described in steps 28, 30, 32, and 34 of FIG. 9, until a desired cardinality or accuracy is found.

As stated above as additional refinements to the present invention, in addition to carrying out dimensionality reduction on training data, dimensionality reduction can also be carried out in each of the merged feature subsets to speed up the feature selection process. As mentioned above, as successive merges reduce the number of feature subsets, the cardinality in each feature subset increases. As such, each of the merged feature subsets may contain redundant information, which need not be exhaustively considered. Therefore, dimensionality reduction in each of the merged feature subsets can also be carried out to speed up the feature selection process.

Such dimensionality reduction may be carried out using the FastMap technique described above, but any other suitable methods, readily apparent to one of ordinary skill in the art, may be utilized.

EXAMPLE 3

As in Example 1, a video retrieval task from a 75-minute 320×240 pixel MPEG-1 encoded classroom instructional video may be implemented using 80 training data (40 announcement frames and 40 others). The dataset and the training data may be identical to that described in Example 1 (see, e.g., FIGS. 4 and 5), except the data may be treated as 1800 one-dimensional feature subsets rather than 300 six-dimensional feature subsets.

For comparison, random feature selection may be utilized. For induction, a combination of FastMap and Mahalanobis techniques, described above, may be utilized. In addition, two different variations of the FSMT feature selection technique, identified as FSMT1 and FSMT2, may be performed. FSMT1 sorts the feature subsets based solely on error rates, but FSMT2 sorts the feature subsets based on error rates and information gain in order to sort feature subsets having similar performance scores.

Figure 11:
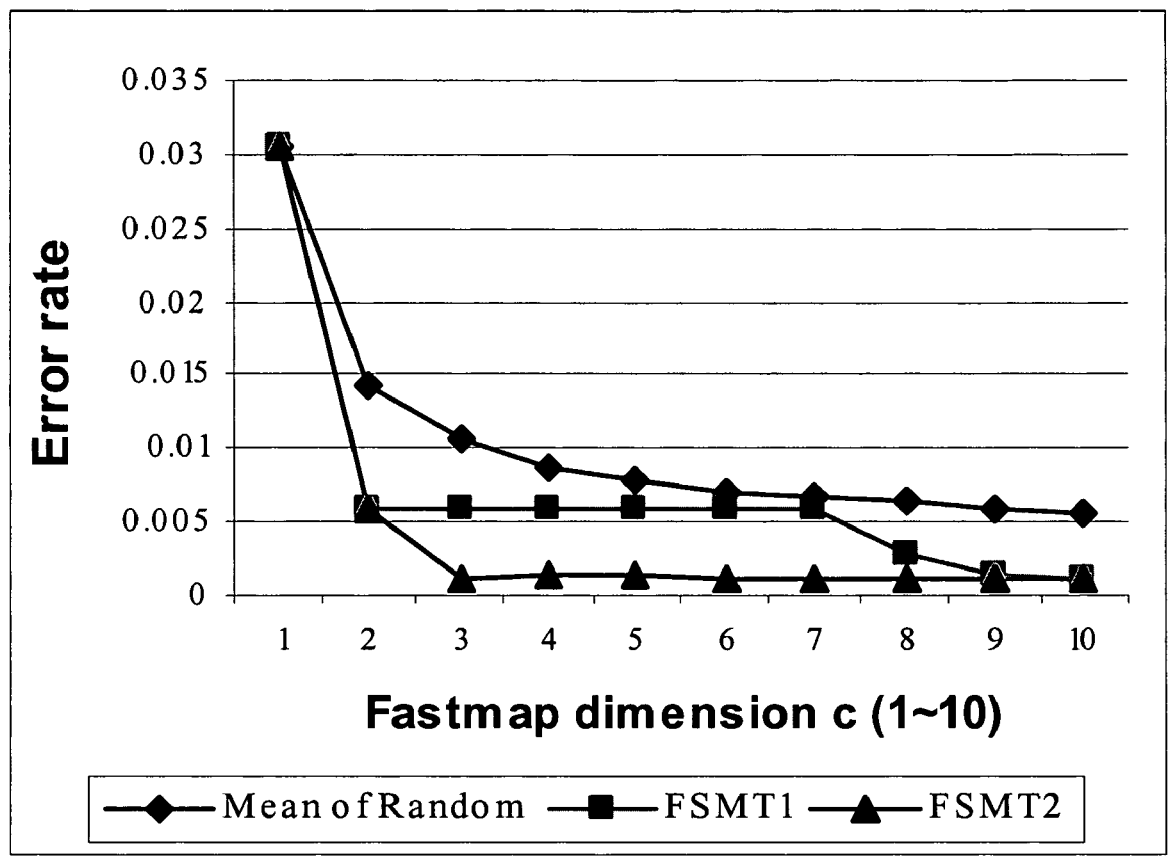
FIG. 11 shows a comparison of error rates obtained as a function of FastMap dimensions (c) using two different variations of a fast-converging sort-merge tree feature selection technique versus a random feature selection technique for a feature subset size of 16 in accordance with certain embodiments of the present invention.

FIG. 11 shows the results that may be obtained using sixteen (r=16) features, when the FastMap dimension varies from 1 to 10 (c=1~10) for the random feature selection technique, FSMT1 feature selection technique, and FSMT2 feature selection technique. As shown, except for c=1, the error rates will typically be lower for the FSMT feature selection techniques as compared to the random feature selection technique. In addition, FSMT2 feature selection technique (which utilized information gain to sort feature subsets having similar performance scores) may generally result in lower error rates than the FSMT1 technique.

EXAMPLE 4

Figure 12:
FIG. 12 shows examples of a frame classified as pitching versus other competing image types in accordance with certain embodiments of the present invention.
Figure 12:
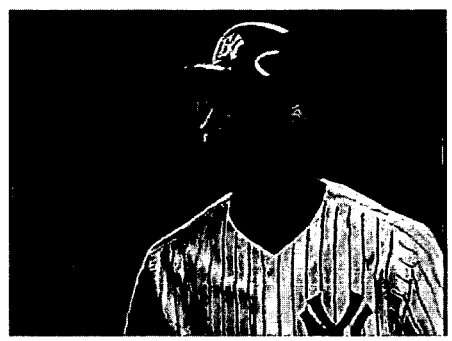
Figure 12:
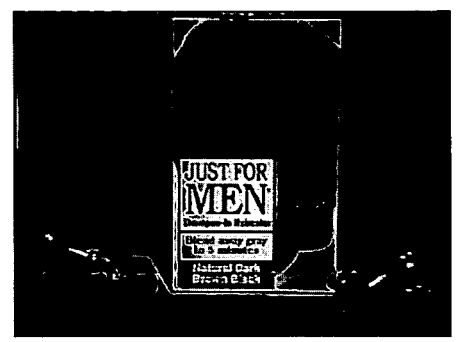
Figure 12:
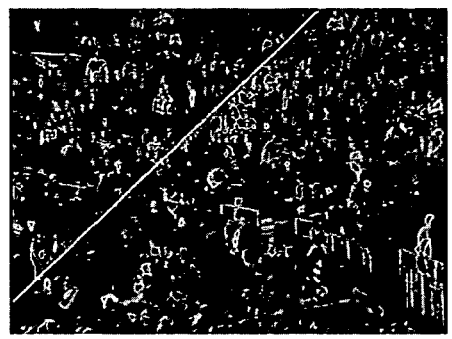
Figure 12:

In Example 4, a video retrieval task from a 30 minute 320×240 pixel MPEG-1 encoded sports video may be implemented. In this task, pitching frames from many different competing image types contained in video, some of which are shown in FIG. 12, may be attempted.

In this example, the data may be sampled more finely, with every I-frame extracted as a data frame, giving 3600 frames for a half-hour of video. The video may be pre-segmented into a series of separate shots, except that contiguous commercials may be considered to be a single segment regardless of how many shots are used. This may result in a video having 182 or so total segments. Retrieval of approximately 45 pitching frame segments from a total 182 segments may then be attempted.

For comparison, the random feature selection may be utilized. For induction, a combination of FastMap and Mahalanobis techniques may also be utilized.

Rather than utilizing error rates as a measure of performance, precision and recall may be measured. Precision can be defined as the ratio of relevant video segments retrieved with respect to all video segments retrieved. This can be represented mathematically as follows:

$$P = \frac{\text{number of relevant video segments retrieved}}{\text{number of all video segments retrieved}} \quad [1]$$

Recall can be defined as the ratio of relevant video segments that are retrieved to all available relevant video segments. This can be represented mathematically as follows:

$$R = \frac{\text{number of relevant video segments retrieved}}{\text{number of relevant video segments}} \quad [2]$$

Table 2 shows the retrieval performance using the random feature selection technique versus the FSMT feature selection technique, wherein the FSMT technique utilizes the information gain during the sort step. As shown, the FSMT feature selection technique may perform much better than the random feature selection technique, especially when the number of selected features is small. For example, using only a feature subset with two (r=2) features from the 1800 original feature subsets, the precision may be nearly perfect and the recall may be near 0.9.

TABLE 2

| Number of Features | Precision | | Recall | |
|---|---|---|---|---|
| | Random | FSMT | Random | FSMT |
| 2 | 0.5983 | 0.9756 | 0.3067 | 0.8889 |
| 4 | 0.7117 | 0.8519 | 0.2711 | 0.5111 |
| 8 | 0.7104 | 0.8205 | 0.2547 | 0.7111 |
| 16 | 0.8008 | 0.9024 | 0.2689 | 0.8222 |
| 32 | 0.8648 | 0.9667 | 0.2804 | 0.6444 |

As shown above, feature selection methods utilizing the FSMT technique can enable considerable savings in computation time by utilizing only a small number of feature subsets to classify data of interest.

Yet even further refinements may be described by realizing that, when dealing with a large dataset having many different data, the entire dataset may not necessarily need a high number of features for classification. Rather, only certain data within the dataset may require refined analysis for proper classification.

For example, in the CSMT and the FSMT feature selection techniques, a user can specify that sixteen (r=16) features should be analyzed for the entire dataset for classification. However, certain data may only require two (r=2) features, while other data may require the full sixteen (r=16) features for correct classification. Clearly, analyzing data using sixteen (r=16) features when only two (r=2) features would have been sufficient leads to undesirable waste of computation time.

Figure 13:
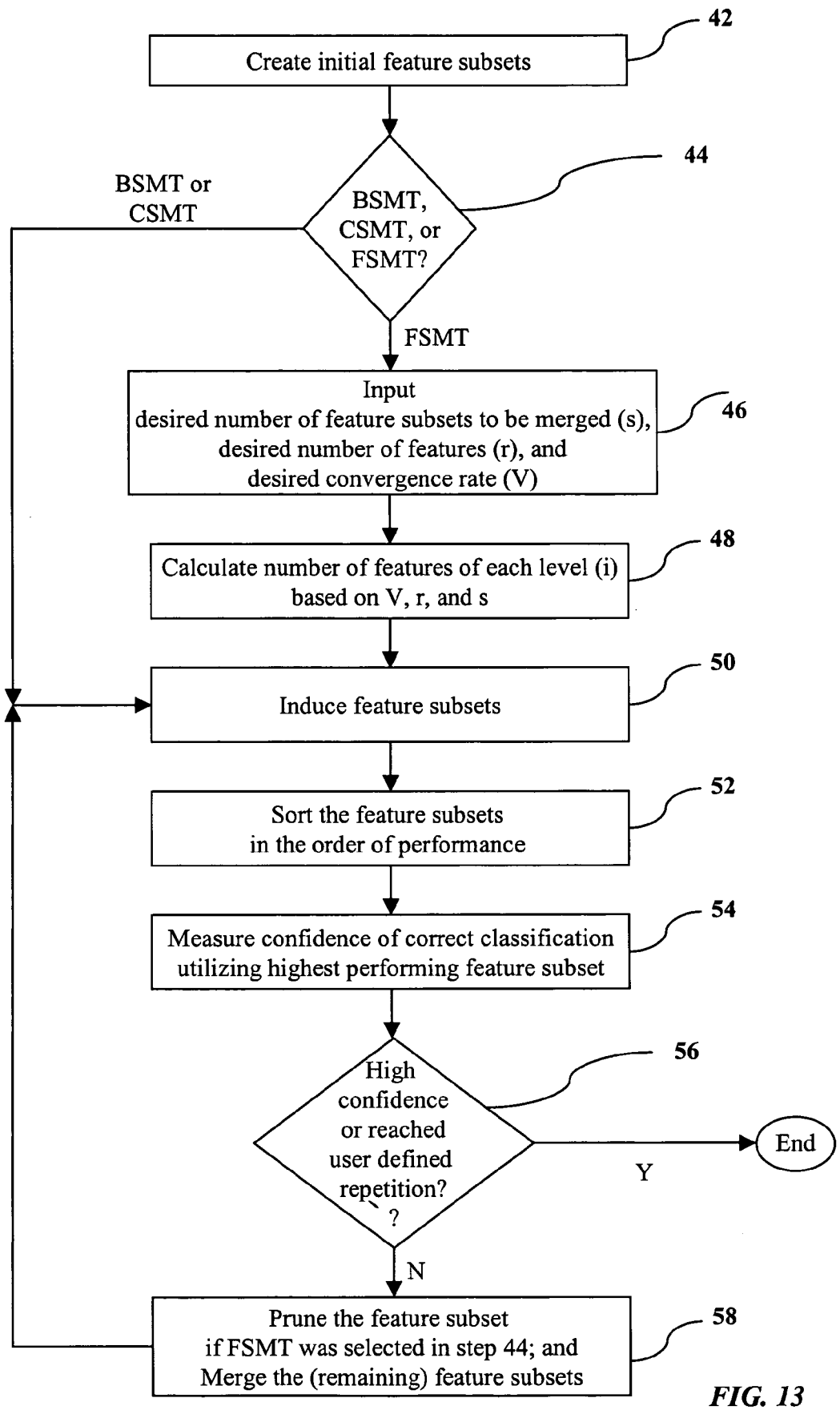
FIG. 13 is a flow chart showing the steps carried out in multi-level feature selection methods in accordance with certain embodiments of the present invention.

Therefore, certain embodiments of the present invention are directed to feature selection methods utilizing a multi-level (ML) feature selection technique. The ML feature selection technique utilizes a confidence level of correct classification, obtained during induction, to determine whether additional refined feature selection analysis may be required. As shown in FIG. 13, methods in accordance with the present invention comprise:

1) creating an N number of singleton feature subsets (denoted as step 42);

2) selecting whether a BSMT, a CSMT, or a FSMT feature selection technique should be utilized (denoted as step 44);

3) if an FSMT feature selection technique is utilized, inputting the desired number of feature subsets to be merged (s), the desired number of evaluation features (r), and the convergence rate (V) of a tree of feature subsets (denoted as step 46);

4) calculating the number of feature subsets for each level (i) of the tree based on r, s, and V (denoted as step 48);

5) inducing the feature subsets, which includes evaluating the performance of the feature subsets on an m number of training data set (denoted as step 50);

6) sorting the feature subsets in the order of performance (denoted as step 52);

7) measuring a confidence level of correct classification (denoted as step 54);

8) determining whether the confidence value is above a certain critical threshold (denoted as step 56); if it is above a certain critical threshold, ending the process;

9) however, if the confidence level is below a certain critical threshold, pruning the feature subset based on i if an FSMT feature selection technique is utilized; and/or merging the sorted feature subset to obtain a smaller number of feature subsets when compared to the preceding groups of feature subsets (denoted as step 58); and 10) repeating steps 50, 52, 54, 56, and 58 until a desired level of confidence has been reached or the number of repetition has reached a user specified value in step 56.

In step 44 of FIG. 13, if an FSMT feature selection technique has not been chosen, steps 46 and 48 are bypassed and the process moves directly to step 50. Additionally, in step 58, if an FSMT feature selection technique has not been chosen in step 44, pruning may be bypassed and only merging may be carried out.

Furthermore, in step 52 of FIG. 13, sorting may be carried out in any suitable manner, as described above. For example, if a CSMT feature selection technique has been chosen in step 44 of FIG. 13, a complement test may be utilized to sort features having similar performance scores. If an FSMT feature selection has been chosen in step 44 of FIG. 13, information gain or a complement test may be utilized to sort features having similar performance scores. Therefore, the ML feature selection technique may enable carrying out feature selection without wasting any valuable computational resources.

Video Segmentation Utilizing ML Feature Selection Technique

Two examples are discussed below to highlight the benefits of the ML feature selection technique. For example, as in the sports video data examples provided above, the dataset might already contain various segments of frames, wherein all of the frames in each segment belong to one particular classification. As such, within each segment, classifying the frames may require only a small number of features to be considered. However, a higher number of features may be needed to correctly classify frames located in the regions where one segment transitions to a next segment.

Figure 14:
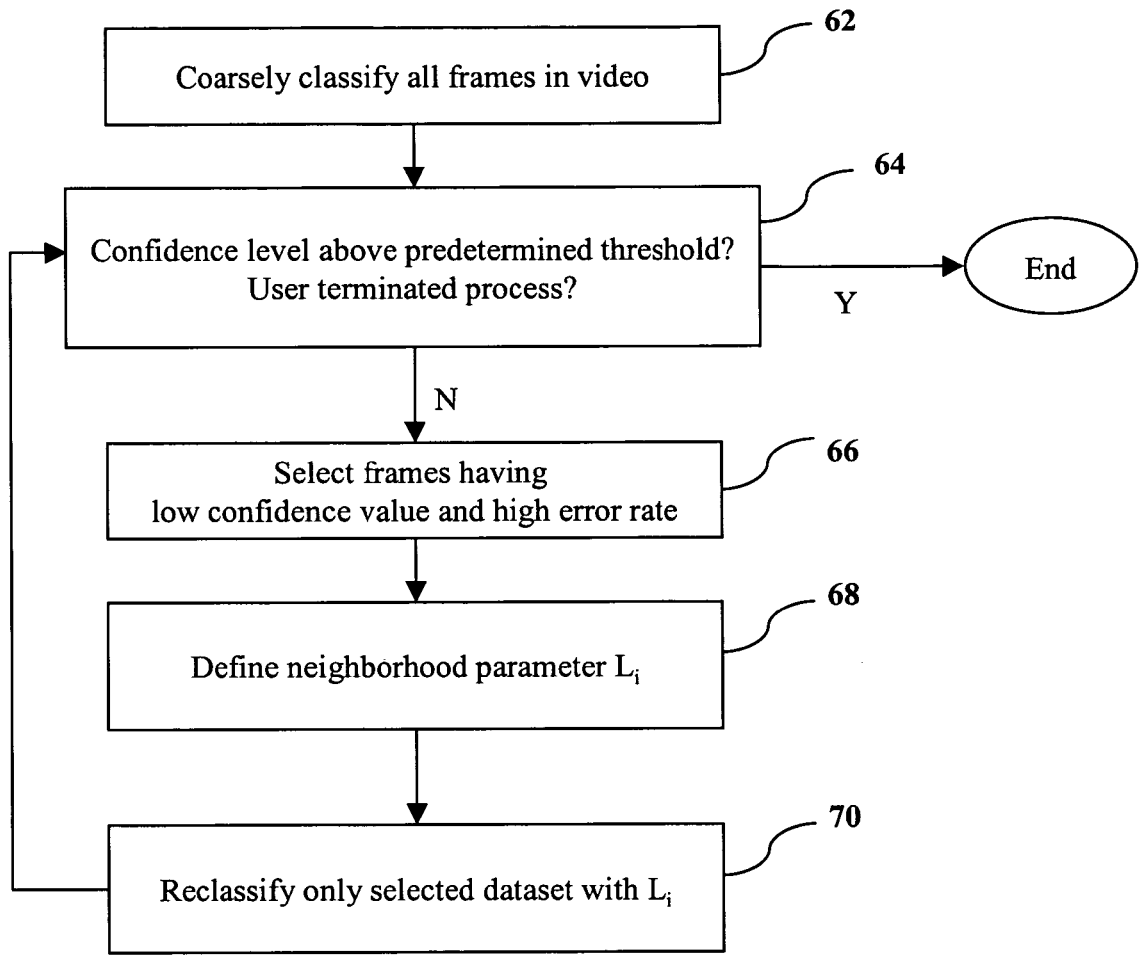
FIG. 14 is a flow chart showing how data segmentation may be carried out using a multi-level feature selection technique in accordance with certain embodiments of the present invention.

As shown in FIG. 14, the ML feature selection technique may be employed for video segmentation. Certain embodiments of the present invention are also directed to methods for segmenting video data comprising:

1) classifying all of the video frames in the video data in a coarse manner using a small number of features (denoted as step 62);

2) determining whether the confidence level in the classified frames is above or below a critical threshold level, or whether the user terminates the process (denoted as step 64);

3) if one or more frames has a confidence level below the critical threshold level and/or the user has not terminated the process, selecting the frames having a low confidence value (denoted as step 66);

4) defining a neighborhood parameter $L_i$, which specifies the size of neighboring frames to be re-classified (denoted as step 68);

5) reclassifying the specified frames by carrying out steps 58, 42, 44, 46, 48, 50, 52, and 54 of FIG. 13 (denoted as step 70); and 6) repeating steps 64, 66, 68, and 70 until the confidence level in the classified frames is above or below a critical threshold level, or until the user terminates the process in step 64.

It should, however, be noted that the present invention is not limited to the methods of segmenting video data. Rather, any type of data, such as video, text, audio, multimedia, and the like, may be segmented. Such modifications would readily be apparent to one of ordinary skill in the art by the disclosure provided herein.

Figure 15:
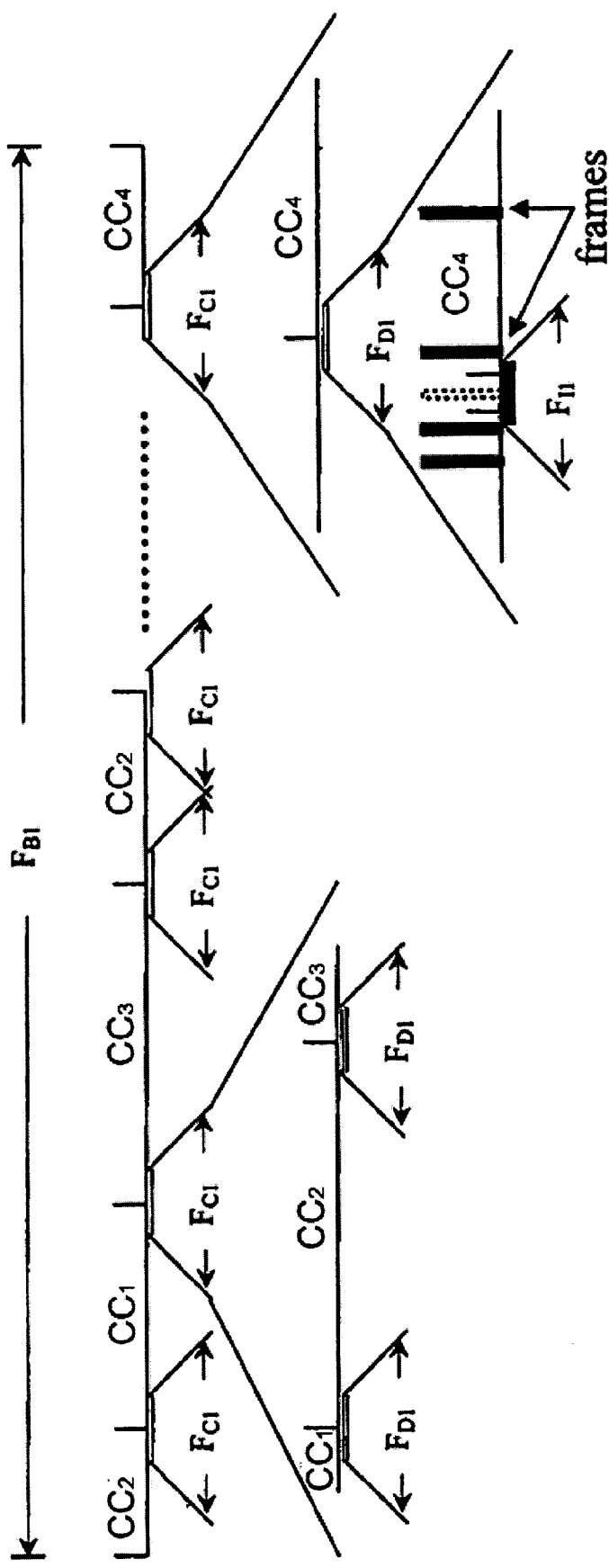
FIG. 15 is a diagram showing how data segmentation may be carried out using a multi-level feature selection technique in accordance with certain embodiments of the present invention.

In step 62 of FIG. 14, all of the video frames may be classified using a very coarse feature subset, such as feature subsets having one, two, four or any other suitable number (r=1, 2, 4, etc.) of features. Any suitable feature selection technique may be utilized which provides a confidence value of correct classification during induction. For example, the best feature subset having a cardinality of two (r=2) from a 300 feature set using either the BSMT, CSMT, or FSMT technique may be selected. Then each frame of the entire video data may be classified into different categories using the BSMT, CSMT, or FSMT technique. In FIG. 15, four different categories are illustrated as being $CC_1$, $CC_2$, $CC_3$, and $CC_4$. The continuous video data may be coarsely classified into discrete segments as follows: the first segment as $CC_2$, the second segment as $CC_1$, the third segment as $CC_3$, the fourth segment as $CC_2$, and the last segment as $CC_4$.

In step 64 of FIG. 14, the video data may then be searched to locate frames having a low confidence value or high error rate. For example, such frames may exist in a region near the boundary of two segments having a first and a second classification (e.g., abrupt (cut) or gradual (fade, dissolve) transitions). Alternatively, such regions may also exist within a well-defined interior segment of a particular classification.

Frames having a low confidence value for correct classification may be selected by defining any appropriate decision threshold function. In certain embodiments of the present invention, the decision threshold function may be defined as:

$$S_i = Pr_m(CC_j) - \Sigma Pr_m(CC_k) \quad [3]$$

where k=1, 2, . . . , n; k≠j; and $Pr_m(CC_j)$ is the maximum Mahalanobis likelihood among all categories using this feature subset.

Effectively, the decision threshold of Equation [3] compares the confidence level of the particular frame belonging to that particular category versus belonging to all the other possible categories. As such, the decision threshold function may ensure that the classification is correct and unambiguous if $S_i$ is a large value.

As shown in FIG. 15, most of frames analyzed by the decision threshold function may simply reaffirm the location of the boundary developed by the initial classification of video data, which agrees with earlier examples wherein the CSMT and FSMT techniques were shown to achieve low error rates using only a small number of feature subsets.

However, if frames having low confidence value of correct classification exist and the user has not terminated the process, these frames may be selected for further analysis in step 66 of FIG. 14.

In step 68 of FIG. 14, the user may then specify a range of frames near the selected frames to be reclassified. For example, a neighborhood parameter $L_i$ may be defined which searches $L_i/2$ number of frames in all directions away from the frames selected in step 68 of FIG. 14.

In step 70 of FIG. 14, the selected frames and their designated neighbors may be reclassified using any one of the BSMT, CSMT, or FSMT techniques. The number of features utilized here should be higher than the number of features that was previously used for classification.

The reclassification may bring about two different results. First, as shown at the transition between $CC_1$ and $CC_3$, it may be possible that an intervening segment of a completely different label is found, such as $CC_2$. Second, the decision threshold may require repeatedly re-examining the frames having low confidence values by using additional available feature subsets to resolve the classification of individual frames with sufficient confidence. This is illustrated at the segment boundary between the last and the next-to-last segments of the video data.

Then, steps 64, 66, 68, and 70 of FIG. 14 may be repeated until a satisfactory confidence level is obtained or until a number of iterations specified by the user has been reached. It should be noted that $L_i$ may be kept constant or may be decreased with each repetition of steps 64, 66, 68, and 70 of FIG. 14.

EXAMPLE 5

In Example 5, video segment boundary refinement may be carried out on an extended instructional video of 75 minutes in MPEG-1 format. As such, the video data may contain 4500 I-frames each with 240×320 pixels, having four different classification: handwriting, announcement, demo, and discussion (see FIG. 5). For training data, 400 I-frames distributed over the video and across these four classifications may be utilized.

Using a simple BSMT technique, the best feature subset utilizing two features (r=2) may be selected for coarse classification of all of the frames in the instructional classroom video data. Then, the video data may be searched using $S_i$ of Equation [3]. 27 video segments that contain frames having decision threshold values below a predetermined critical decision threshold value may then be selected. These frames are listed in the first column of Table 3, with the number of frames indicated in parentheses.

TABLE 3

| | Clip | | | | |
|---|---|---|---|---|---|
| Fraction of video examined | r = 2, c = 9<br>100%<br>(= 4500/4500) | r = 4, c = 7<br>6.3%<br>(= 282/4500) | r = 8, c = 4<br>7.3%<br>(= 329/4500) | r = 16, c = 4<br>2.3%<br>(= 104/4500) | R = 32, c = 3<br>1.2%<br>(= 54/4500) |
| 1 | 109 (1) | 109 (1) | 109 (1) | 109 (1) | 109 (1) |
| 2 | 212 (1) | 212 (1) | 212 (1) | 212 (1) | 212 (1) |
| 3 | 240 (1) | 237-243 (7) | 234-240 (7) | 240 (1) | 240 (1) |
| 4 | 251 (1) | 251 (1) | 251 (1) | 251 (1) | 251 (1) |
| 5 | 1389-1410 (22) | 1410 (1) | 1408-1411 (4) | 1410 (1) | 1410 (1) |
| 6 | 1532-1533 (2) | 1532-1536 (5) | X | X | X |
| 7 | 2566-2567 (2) | 2563-2567 (5) | X | X | X |
| 8 | 2571-2572 (2) | 2571-2572 (2) | X | X | X |
| 9 | 2577-2578 (2) | 2577-2578 (2) | X | X | X |
| 10 | 2630-2632 (3) | 2630-2632 (3) | 2629-2632 (5) | 2629-2632 (5) | X |
| 11 | 2763-2764 (2) | 2762-2764 (3) | 2762-2763 (2) | 2763-2764 (2) | X |
| 12 | 2880-2887 (8) | 2880-2890 (11) | X | X | X |
| 13 | 2895-2904 (10) | 2892-2905 (14) | X | X | X |
| 14 | 2942-2944 (3) | 2942-2944 (3) | X | X | X |
| 15 | 3103-3116 (14) | 3103-3119 (17) | X | X | X |
| 16 | 3138-3141 (4) | 3138-3144 (7) | X | X | X |
| 17 | 3165-3166 (2) | 3163-3169 (7) | 3164-3169 (6) | X | X |
| 18 | 3174-3175 (2) | 3171-3178 (8) | 3170-3180 (11) | X | X |
| 19 | 3184-3190 (7) | 3181-3190 (10) | 3181-3186 (6) | X | X |
| 20 | 3249-3250 (2) | 3249-3250 (2) | X | X | X |
| 21 | 3271-3275 (5) | 3268-3275 (8) | X | X | X |
| 22 | 3287-3289 (3) | 3287-3289 (3) | X | X | X |
| 23 | 3304-3305 (2) | 3301-3308 (8) | X | X | X |
| 24 | 3366-3369 (4) | 3364-3372 (9) | X | X | X |
| 25 | 3380-3389 (10) | 3377-3392 (16) | X | X | X |
| 26 | 3401-3402 (2) | 3398-3405 (8) | X | X | X |
| 27 | 3408-3410 (3) | 3406-3410 (5) | X | X | X |
| Ambiguous frames | 120 | 167 | 44 | 12 | 5 |

For these frames, feature subsets having four (r=4) features are utilized for reclassification. In all the subsequent frames, a neighborhood parameter of six (L=6) may be kept constant, meaning 3 frames before and after any ambiguous frames are re-examined and reclassified with a feature subset having a higher number of features (r). For example, since frame 109 has a decision threshold value below the predetermined critical value, frames 106 to 112 will be re-examined using r=4. Similarly, since each of frames 2880 to 2887 all have a decision threshold value below the predetermined critical value, frames 2877 to 2890 will be re-examined with r=4.

As can be seen from the second column, a total of 120 frames are ambiguous (e.g., had low confidence value that the initial classification was correct). As such, only 282 (i.e., 120+(6×27)) frames are re-examined for classification. This translates to roughly only 6.3% (i.e., 282/4500) of the segments being re-examined. Clearly, a tremendous savings in computation time is evident.

The column labeled r=4, c=7 lists the frame numbers that again fail to meet or exceed the critical decision threshold value. Comparing the results of the frame from the third column with the coarser number of features in the previous (second) column, several different possible outcomes are evident.

First, as shown in clip 5, some frame ranges are partially resolved, where the number of ambiguous frames is reduced from 22 to 1. Second, as in clip 1, the same number of frames remains ambiguous. Third, as in clip 3, the entire expanded neighborhood fails to meet the more refined classification method and more frames are re-examined for reclassification. Instances such as the third outcome may increase the fraction of videos to be determined in the next refined classification step. In the present example, the fraction of video to be reclassified may increase to 7.3% from 6.3%.

Fourth, as shown in the fourth column (r=8, c=4), all frames in many clips are classified with the required level of confidence and no longer need reclassification. This is the most desired outcome among the four shown above.

Figure 16:
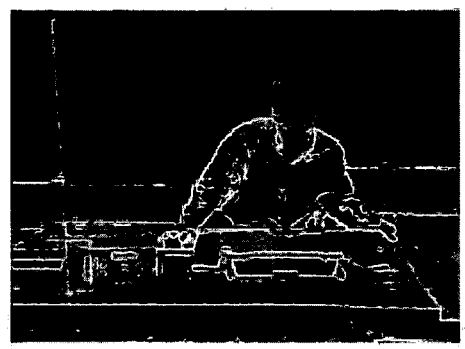
FIG. 16 shows frames that properly remain ambiguous even after a 32-feature subset was utilized to classify the frames.
Figure 16:
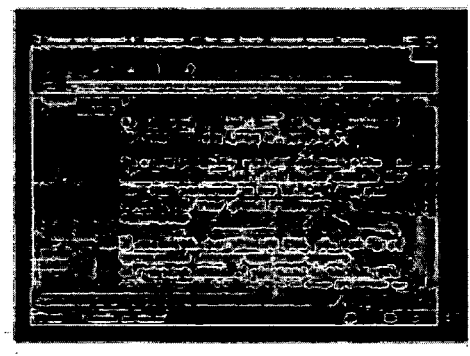
Figure 16:
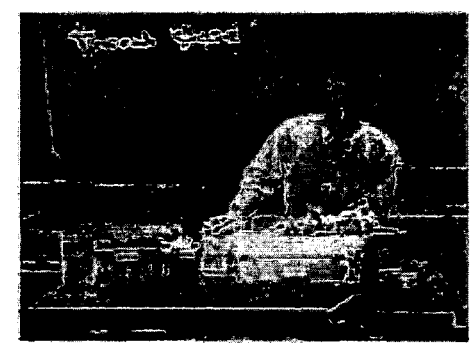

In this example, the classification is terminated at r=32 as an error rate of 0.002 can be obtained, which the user can pre-specify to be sufficient. FIG. 16 shows three example frames that remain ambiguous even after classification using a 32-feature subset. These frames are approximately midpoints of gradual transitions from one classification to another. As such, the ambiguous classification that would be obtained by the process is actually proper.

Clearly, the present invention provides accurate and fast video segmentation to be performed as most of the processing can be done with feature subsets having a small number of features. In this example, on average, only 3.6 features are used per frame.

Lazy Evaluation of Unanticipated On-Line Queries

Figure 17:
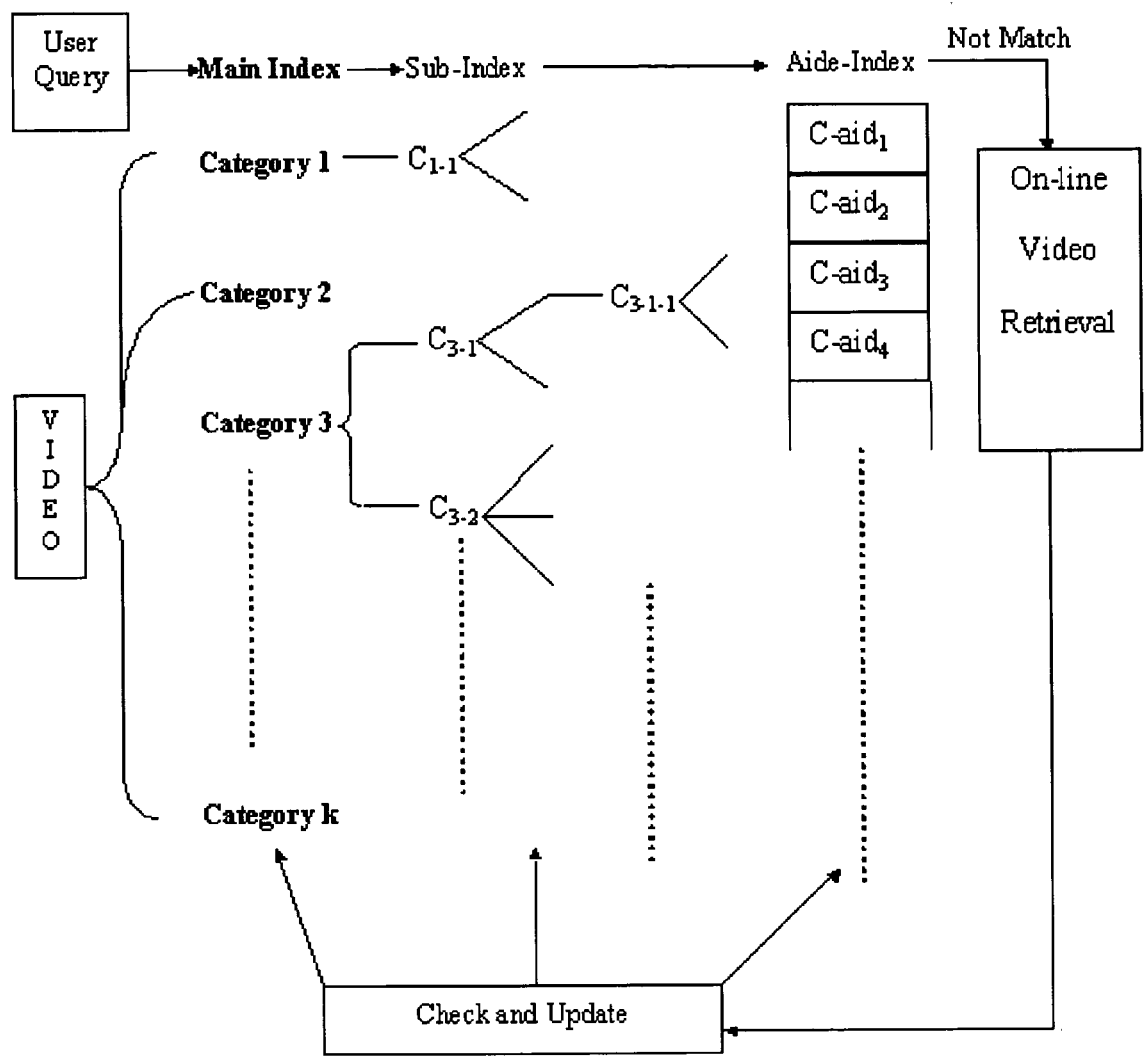
FIG. 17 is a diagram showing how lazy evaluation of unexpected on-line queries can be carried out using a multi-level feature selection technique in accordance with certain embodiments of the present invention.

FIG. 17 shows how the ML feature selection technique may enable lazy evaluation of unanticipated on-line queries. For example, a search engine may classify a dataset into categories that users are often interested in, and construct a main index with text tags for retrieval. As shown in FIG. 17, a user of the search engine may then input a textual query, which is first matched with the main textual index, then with any sub-indices and/or auxiliary indices that were created. If no matches are found, on-line evaluation and retrieval can be performed.

For example, a textual query might be "sedan." The main index may have "automobile" as a textual label. In this instance, a query of "sedan" (which we exemplify here with the implication that it is a sub-index of "automobile") will not find a match. At this point, an on-line evaluation and retrieval may be carried out.

In an on-line evaluation, the user may provide small training data, both positive and negative examples of data that correspond to the textual query. Positive examples are data that can be classified to be equivalent to the textual query. Negative examples are data that can be classified as not being equivalent to the textual query.

For example, 20 data corresponding to "sedan" (positive data) and 20 data not corresponding to "sedan" (negative data), such as pickups and sports utility vehicles (SUVs) may be provided as training data from the original dataset. Recall, these data have already been classified in the off-line part as being an "automobile."

From the 40 training data, 5 positive and 5 negative training data may be set aside to be used as the test data, and the remaining 15 positive and 15 negative data may be used as the actual training data. Then, the ML feature selection technique can be performed to seek the appropriate feature subset, having a minimal number of features, which can discriminate the positive and negative data.

Subsequently, using the trained features, other data contained in the original dataset of the main index "automobile" may be offered to the user asking whether these proposed data are indeed a "sedan." The user may then answer affirmatively on some and negatively on others, effectively creating additional training data that can be used for additional refinement. As before, ML feature selection technique may be run, thereby progressively increasing the number of features in the feature subset until satisfactory discrimination of all (old and new) positive and negative data is achieved.

At this point, the textual query and its successful feature subset that allowed satisfactory discrimination may be stored in one of three ways. First, if the clips match an existing labeled set of clips in the index, then the new label may be stored as a synonym in the main index. For example, rather than querying "sedan," a "car" may be queried. Then, the word can be looked-up using any well-known database of synonyms.

Second, if the textual query is a proper subset of one or more main index terms, then both the text and the feature subset that allowed satisfactory discrimination may be stored in a sub-index (i.e., a new subset index will be created and labeled as "sedan"). As illustrated above, although various "automobile" data were presented, only a subset of these data were indicated as being a satisfactory match to the query "sedan." As such, "sedan" will be stored as a proper sub-index of "automobile" along with the feature subset that allowed satisfactory discrimination.

Third, if textual query is neither a synonym nor a proper subset of one or more main index terms, then the text and feature subset may be stored in a simple auxiliary index (or in any other appropriate data structure).

It should be noted that the speed benefit of the ML feature selection technique enables rapid evaluation and retrieval of on-line queries even on a dataset containing a massive volume of information. In addition, as described in detail above, the indexing system may become self-adaptive over time.

Figure 18:
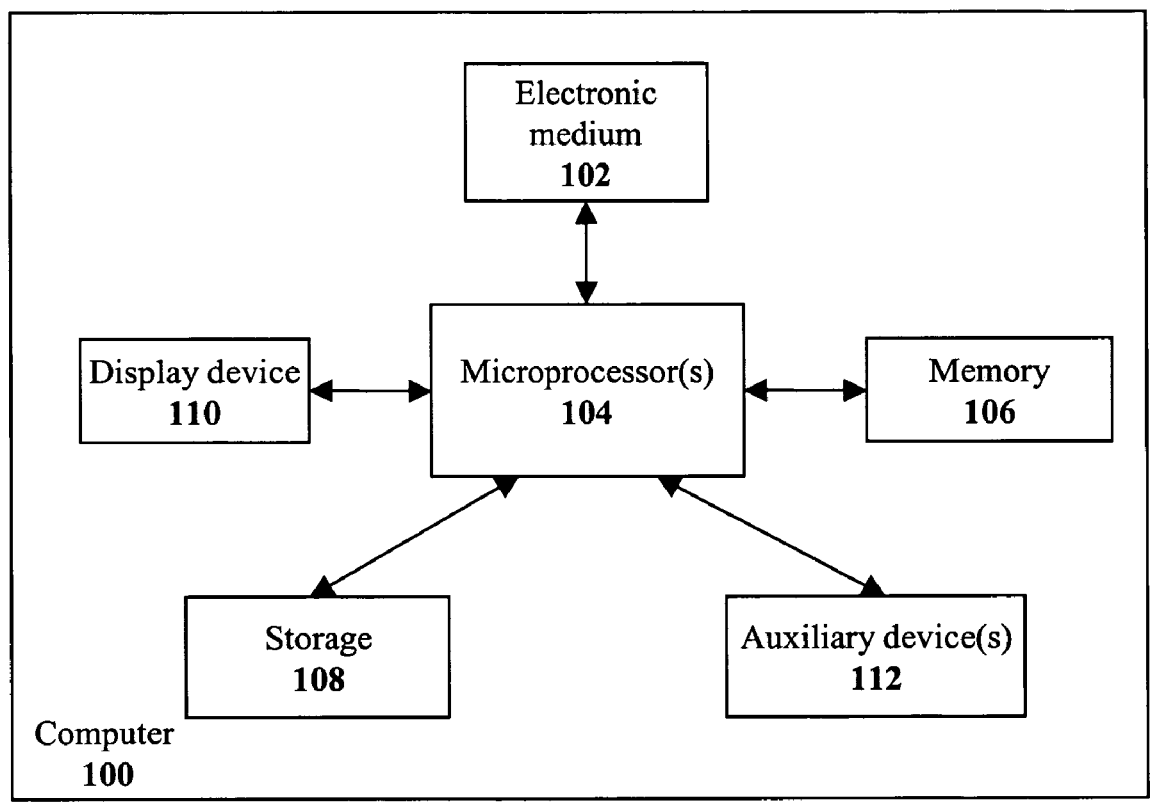
FIG. 18 is a diagram of a system capable of carrying out feature selection utilizing a complement sort-merge tree, a fast-converging merge-tree, or a multi-level feature selection technique in accordance with certain embodiments of the present invention.

Other embodiments of the present invention are directed to systems for feature selection utilizing a CSMT, FSMT, and/or ML technique. As shown in FIG. 18, systems in accordance with the present invention may be a computer 100 composed of an electronic medium 102, a processor 104, memory 106, a storage device 108, an output (display) device 110, an input device 112, and auxiliary device(s) 114. The electronic medium may contain routines capable of instructing the systems to perform the CSMT, FSMT, and/or ML feature selection techniques described above.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A method for feature selection, comprising:
   a) creating a plurality of initial feature subsets from data;
   b) inducing said initial feature subsets on training data to obtain induced feature subsets;
   c) sorting said induced feature subsets obtained in b) in order of performance to obtain sorted feature subsets,
   d) identifying induced feature subsets having similar performance and sorting said induced features subsets having similar performance using a heuristic technique;
   e) merging said sorted feature subsets obtained in d) or h) to obtain merged feature subsets;
   f) inducing said merged feature subsets obtained in e) on training data to obtain induced feature subsets;
   g) sorting said induced feature subsets obtained in f) in order of performance,
   h) identifying induced feature subsets having similar performance and sorting said induced features subsets having similar performance using a heuristic technique; and
   i) repeating at least one of e), f), g), and h) until a desired user specified criterion is satisfied.

2. The method as claimed in claim 1, wherein said heuristic technique is a complement test.

3. The method as claimed in claim 1, wherein said inducing in b) and f) are carried out using a combination of FastMap and Mahalanobis maximum likelihood techniques.

4. The method as claimed in claim 1, wherein in b) and f), each induced feature subset has a performance score.

5. The method as claimed in claim 4, wherein in i), the method is repeated until a desired performance score is obtained in f).

6. The method as claimed in claim 1, wherein in a), each feature subset has a cardinality of one.

7. The method as claimed in claim 1, wherein in i), the method is repeated until a desired number of cardinality is obtained in said feature subsets in e).

8. The method as claimed in claim 1, wherein in e), at least two sorted feature subsets are merged.

9. The method as claimed in claim 1, wherein in e), said sorted feature subsets are merged pairwise.

10. The method as claimed in claim 1, further comprising:
    h) classifying said data.

11. The method as claimed in claim 1, wherein said data is at least one selected from the group consisting of text, images, audio, video, gene microarray data, and handwriting.

12. The method as claimed in claim 1, wherein in c) and g), induced feature subsets having equal performance are sorted using a heuristic technique.

13. A method for feature selection, comprising:
a) creating a plurality of initial feature subsets from data;
b) designing a desired feature subset tree based on one or more user inputs;
c) inducing said initial feature subsets on training data to obtain induced feature subsets;
d) sorting said induced feature subsets obtained in c) in order of performance to obtain sorted feature subsets;
e) pruning said sorted feature subsets obtained in d) or h) based on said desired feature subset tree to obtain pruned feature subsets;
f) merging said pruned feature subsets obtained in e) to form merged feature subsets;
g) inducing said merged feature subsets obtained in f) on training data to obtain induced feature subsets;
h) sorting said induced feature subsets obtained in g) in order of performance to obtain sorted feature subsets;
i) repeating at least one of e), f), g), and h) until a desired user specified criterion is satisfied.

14. The method as claimed in claim 13, wherein said inducing in c) and g) are carried out using a combination of FastMap and Mahalanobis maximum likelihood techniques.

15. The method as claimed in claim 13, wherein said sorting in d) and h) utilize at least an information gain technique.

16. The method as claimed in claim 13, wherein in b), said one or more user inputs comprise a desired cardinality for one or more final feature subsets and a convergence rate of said feature subsets tree.

17. The method as claimed in claim 13, wherein in b), said feature subsets tree is designed top-down.

18. The method as claimed in claim 13, wherein in b), said feature subsets tree is designed bottom-up.

19. The method as claimed in claim 13, wherein in c) and g), each induced feature subset has a performance score.

20. The method as claimed in claim 19, wherein in i), the method is repeated until a desired performance score is obtained in g).

21. The method as claimed in claim 13, wherein in a), each feature subset has a cardinality of one.

22. The method as claimed in claim 13, wherein in i), the method is repeated until a desired number of cardinality is obtained in said feature subsets in f).

23. The method as claimed in claim 13, wherein in f), at least two pruned feature subsets are merged.

24. The method as claimed in claim 13, wherein in f), said pruned feature subsets are merged pairwise.

25. The method as claimed in claim 13, further comprising:
h) classifying said data.

26. The method as claimed in claim 13, wherein said data is at least one selected from the group consisting of text, images, audio, video, gene microarray data, and handwriting.

27. A method for feature selection, comprising:
a) creating a plurality of initial feature subsets from data;
b) inducing said initial feature subsets on training data to obtain induced feature subsets;
c) sorting said induced feature subsets obtained in b) in order of performance to obtain sorted feature subsets;
d) classifying said data with a feature subset having the highest performance;
e) measuring a confidence level of correct classification for said data;
f) comparing said confidence value with a threshold value;
g) if said confidence value does not satisfy said threshold value:
g1) merging said sorted feature subsets obtained in c) or g3) to obtain merged feature subsets;
g2) inducing said merged feature subsets obtained in g1) on training data to obtain induced feature subsets;
g3) sorting said induced feature subsets obtained in g2) in order of performance to obtain sorted feature subsets;
g4) classifying said data with a feature subset having the highest performance; and
h) repeating at least one of e), f), and g), until a desired user specified criterion is satisfied or until said confidence value is above said threshold value in f).

28. The method as claimed in claim 27, wherein said inducing in b) and g2) are carried out using a combination of FastMap and Mahalanobis maximum likelihood techniques.

29. The method as claimed in claim 27, wherein in b) and g2), each induced feature subset has a performance score.

30. The method as claimed in claim 29, wherein in h), the method is repeated until a desired performance score is obtained in g2).

31. The method as claimed in claim 27, wherein in a), each feature subset has a cardinality of one.

32. The method as claimed in claim 31, wherein in h), the method is repeated until a desired number of cardinality is obtained in said feature subsets in g1).

33. The method as claimed in claim 27, wherein in g1), at least two sorted feature subsets are merged.

34. The method as claimed in claim 27, wherein in g1), said sorted feature subsets are merged pairwise.

35. The method as claimed in claim 27, further comprising:
h) classifying said data.

36. The method as claimed in claim 27, wherein said data is at least one selected from the group consisting of text, images, audio, video, gene microarray data, and handwriting.

37. A method for segmenting a dataset comprising a plurality of data, comprising:
a) creating a plurality of initial feature subsets from each of said plurality of data;
b) inducing said initial feature subsets on training data to obtain induced feature subsets;
c) sorting said induced feature subsets obtained in b) in the order of performance to obtain sorted feature subsets;
d) classifying said plurality of data with a feature subset having the highest performance associated with each data;
e) measuring a confidence level of correct classification for each data;
f) comparing said confidence level for each data with a threshold value;
g) selecting one or more data from said plurality of data having said confidence value below that does not satisfy said threshold value;
h) merging said sorted feature subsets obtained in c) or j) of said one or more data having a confidence value that does not satisfy said threshold value to obtain merged feature subsets;
i) inducing said merged feature subsets obtained in h) on training data to obtain induced feature subsets;
j) sorting said induced feature subsets obtained in i) in order of performance to obtain sorted feature subsets;

k) classifying said one or more data with a feature subset having the highest performance; and l) repeating at least one of e), f), g), h), i), j), and k) until a desired user specified criterion is satisfied or until all of said plurality of data have confidence values above said threshold value in e).

38. The method as claimed in claim 37, wherein said inducing in b) and i) are carried out using a combination of FastMap and Mahalanobis maximum likelihood techniques.

39. The method as claimed in claim 37, wherein in b) and i), each induced feature subset has a performance score.

40. The method as claimed in claim 39, wherein in l), the method is repeated until a desired performance score is obtained in i).

41. The method as claimed in claim 37, wherein in a), each feature subset has a cardinality of one.

42. The method as claimed in claim 41, wherein in l), the method is repeated until a desired number of cardinality is obtained in said feature subsets in h).

43. The method as claimed in claim 37, wherein in h), at least two of said sorted feature subsets are merged.

44. The method as claimed in claim 37, wherein in h), said sorted feature subsets are merged pairwise.

45. The method as claimed in claim 37, wherein said dataset is at least one selected from the group consisting of text, images, audio, video, gene microarray data, and handwriting.

46. A computer readable medium comprising instruction being executed by a computer, the instructions including a software application for feature selection, the instructions for implementing the steps of:
  a) creating a plurality of initial feature subsets from data;
  b) inducing said initial feature subsets on training data to obtain induced feature subsets;
  c) sorting said induced feature subsets obtained in b) in order of performance to obtain sorted feature subsets,
  d) identifying induced feature subsets having similar performance and sorting said induced features subsets having similar performance using a heuristic technique;
  e) merging said sorted feature subsets obtained in d) or h) to obtain merged feature subsets;
  f) inducing said merged feature subsets obtained in e) on training data to obtain induced feature subsets;
  g) sorting said induced feature subsets obtained in f) in order of performance,
  h) identifying induced feature subsets having similar performance and sorting said induced features subsets having similar performance using a heuristic technique; and
  i) repeating at least one of e), f), g), and h) until a desired user specified criterion is satisfied.

47. A computer readable medium comprising instruction being executed by a computer, the instructions including a software application for feature selection, the instructions for implementing the steps of:
  a) creating a plurality of initial feature subsets from data;
  b) designing a desired feature subset tree based on one or more user inputs;
  c) inducing said initial feature subsets on training data to obtain induced feature subsets;
  d) sorting said induced feature subsets obtained in c) in order of performance to obtain sorted feature subsets;
  e) pruning said sorted feature subsets obtained in d) or h) based on said desired feature subset tree to obtain pruned feature subsets;
  f) merging said pruned feature subsets obtained in e) to form merged feature subsets;
  g) inducing said merged feature subsets obtained in f) on training data to obtain induced feature subsets;
  h) sorting said induced feature subsets obtained in g) in order of performance to obtain sorted feature subsets;
  i) repeating at least one of e), f), g), and h) until a desired user specified criterion is satisfied.

* * * * *